United States Patent
Fujishima

(10) Patent No.: US 7,599,660 B2
(45) Date of Patent: Oct. 6, 2009

(54) BASE STATION APPARATUS AND CONTROL METHOD FOR CONTROLLING CHANNEL DENSITY

(75) Inventor: Kenzaburo Fujishima, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 483 days.

(21) Appl. No.: 11/196,294

(22) Filed: Aug. 4, 2005

(65) Prior Publication Data
US 2006/0189353 A1 Aug. 24, 2006

(30) Foreign Application Priority Data
Feb. 21, 2005 (JP) ............................. 2005-043366

(51) Int. Cl.
*H04B 7/14* (2006.01)
(52) U.S. Cl. ........................................ 455/17; 455/464
(58) Field of Classification Search ................. 370/321, 370/345, 329, 331; 455/450, 464, 17, 422.1
See application file for complete search history.

(56) References Cited

U.S. PATENT DOCUMENTS
6,480,526 B1 * 11/2002 Shoki et al. ................. 375/147

2004/0246916 A1 * 12/2004 Tanada et al. ............... 370/321
2006/0126519 A1 * 6/2006 Rensburg et al. ............ 370/248

FOREIGN PATENT DOCUMENTS
JP 10-66138 3/1998

OTHER PUBLICATIONS
3rd Generation Partnership Project 2 (3GPP2) C. S0024-A, "cdma2000 High Rate Packet Data Air Interface Specification", pp. 9-94, 9-95 and 13-45, Mar. 31, 2004.

* cited by examiner

*Primary Examiner*—Tu X Nguyen
(74) *Attorney, Agent, or Firm*—Antonelli, Terry, Stout & Kraus, LLP.

(57) ABSTRACT

A base station apparatus is provided for adaptively controlling a maximal accommodation channel number per unit area (for example, the coverage area of a cell or sector) in accordance with a traffic quantity without relying upon detachment of a mobile base station and installation of a repeater. Upon inputting of a plurality of baseband signals of a user channel-multiplexed channel group, linear coupling is performed by a weight which is different per area that outputs it, thereby enabling control of the channel density. Additionally, a per-group available channel number is constantly monitored to control the weight while using threshold judgment for the available channel number as a trigger, thus achieving situation-sensitive prompt handleability.

14 Claims, 19 Drawing Sheets

FIG. 9

| SCRAMBLE CODE | THE NUMBER OF AVAILABLE CHANNELS | CHANNEL ASSIGNMENT ||||
|---|---|---|---|---|---|
| | | 1 | 2 | 3 | 4 |
| PN1 | 3 | ID 102 | | | |
| PN2 | 1 | ID 103 | ID 104 | ID 105 | |
| PN3 | 0 | ID 106 | ID 107 | ID 108 | ID 109 |
| PN4 | 4 | | | | |

| BTS/FE | DSC | OUTPUT LEVEL | | | | DEPENDENCE | BTS/FE STATUS | BTS/FE NEIGHBORING |
|---|---|---|---|---|---|---|---|---|
| | | PN 1 | PN 2 | PN 3 | PN 4 | | | |
| a | PN1 | 1 | | | 0.5 | SLAVE (PN4) | 3 | b, c |
| b | PN2 | | 1 | | 0.5 | SLAVE (PN4) | 3 | a, c |
| c | PN3 | | | 1 | 0.5 | SLAVE (PN4) | 3 | a, b |

| BTS/FE | DSC | OUTPUT LEVEL | | | | DEPENDENCE | BTS/FE STATUS | BTS/FE NEIGHBORING |
|---|---|---|---|---|---|---|---|---|
| | | PN 1 | PN 2 | PN 3 | PN 4 | | | |
| a | PN1 | 1 | | | | MASTER (PN1) | 1 | b, c |
| b | PN2 | 1 | | | | SLAVE (PN1) | 1 | a, c |
| c | PN3 | 1 | | | | SLAVE (PN1) | 1 | a, b |

| BTS/ FE | DSC | OUTPUT LEVEL ||||  DEPENDENCE | BTS/ FE STATUS | BTS/FE NEIGHBORING |
|---|---|---|---|---|---|---|---|---|
| | | PN 1 | PN 2 | PN 3 | PN 4 | | | |
| a | PN1 | 1 | | | | MASTER (PN1) | 2 | b, c |
| b | PN2 | | 1 | | | MASTER (PN2) | 2 | a, c |
| c | PN3 | | | 1 | | MASTER (PN3) | 2 | a, b |

| BTS/FE | DSC | OUTPUT LEVEL ||||  DEPENDENCE | BTS/FE STATUS | BTS/FE NEIGHBORING |
|---|---|---|---|---|---|---|---|---|
| | | PN 1 | PN 2 | PN 3 | PN 4 | | | |
| a | PN1 | 1 | | | 0.5 | SLAVE (PN4) | 3 | b, c |
| b | PN2 | | 1 | | 0.5 | SLAVE (PN4) | 3 | a, c |
| c | PN3 | | | 1 | 0.5 | SLAVE (PN4) | 3 | a, b |

BASE STATION APPARATUS AND CONTROL METHOD FOR CONTROLLING CHANNEL DENSITY

INCORPORATION BY REFERENCE

The present application claims priority from Japanese application JP2005-043366 filed on Feb. 21, 2005, the content of which is hereby incorporated by reference into this application.

BACKGROUND OF THE INVENTION

The present invention relates to a base station apparatus for use in mobile communications systems.

A technique for providing a mobile cellular communication system capable of eliminating communication failure states otherwise occurring due to temporal congestion is disclosed in JP-A-10-66138. This mobile communication system is such that a plurality of network-linkable fixed base stations communicate via radio channels with mobile phones existing in coverage areas of the fixed base stations, wherein the mobile communication system includes a first detector unit for detecting from among the plurality of fixed base stations a first fixed base station which presently experiences occurrence of congestion, a mobile base station which is movable in the air for setup of a radio channel that is free from interference or cross-talk with the radio channel being presently used by the first fixed base station and for performing communication with a mobile phone existing in an area of the first fixed base station by way of the interference-free radio channel, and a control device for controlling the movement or "migration" of the movable base station based on a detection result of the first fixed base station. More specifically, let the movable base station move to the area having convergence problems for setting up a radio channel at which the convergence does not occur and for permitting communication between the movable base station and the mobile phone, thereby achieving the objective that avoids communication failure state due to temporal congestion. Additionally, depending on circumstances, the same object is achieved by causing the movable base station to operate as a repeater of a fixed base station having many out-of-use or "vacant" channels, also known as available channels.

SUMMARY OF THE INVENTION

However, the prior known technique is designed based on the premise that the movable base station moves to the area at which congestion takes place. The movement of such movable base station causes two problems. One of them is an increase in cost for moving the movable base station. Practically, extra costs are required including a movement cost of the movable base station per se, and an expense for dispatching an engineer who controls the movable base station. The other problem is a delay of a response to a rapid traffic increase. Although such traffic increase is handleable by dispatching the movable base station in advance to meeting places or holiday resorts in which a great number of people are expected to get together, what can be done is to take mere follow-up measures for coping with a traffic increase at the time unpredictable accidents or disasters occur. If this is the case, the congestion is not resolvable until arrival of the movable base station. This would reduce the inherent convenience of mobile communication technology, such as the capability to communicate anywhere at any time.

The present invention has been made to solve the problems above, and an object of the invention is to provide a base station apparatus for adaptively controlling a maximal accommodative channel number per unit area (for example, the coverage range of a cell or a sector) in a way pursuant to a traffic quantity without accompanying the movement of any base station.

This invention provides a base station apparatus for adaptive control of the maximum accommodative channel number per unit area in accordance with the traffic quantity without requiring the movement of base station. To do this, the base station apparatus includes a plurality of front end units for transmitting signals to a plurality of areas respectively, wherein the signal being transmitted at each front end unit is generated adaptively.

In traditional code division multiple access (CDMA) cellular systems, the front end unit applies scramble to a single area, called the cell or sector, by means of a per-area different pseudo noise (PN) code, whereby user multiplex communication is carried out by use of a family of orthogonal codes known as Walsh codes in respective areas.

In this invention, its objective is to generate a new PN code area at a prior known area boundary, by causing a single front end unit to perform multiplex transmission of a different PN code signal and also by permitting a plurality of front end units to transmit forth the same PN code signal simultaneously. Creating such new PN code area makes it possible to increase the number of simultaneously communicable terminals in an area that the front end unit can cover during wireless or radio communication. In other words, it is possible to increase the maximum accommodative channel number per the unit area. In addition, by letting the base station apparatus monitor the traffic quantity per PN code, it is possible to determine or "judge" whether the PN code area is newly created or deleted. This enables adaptive control of the above-noted maximum accommodative channel number. Accordingly, the object of the invention is achieved.

According to the invention, it becomes possible to adaptively control the channel's area density without having to dispatch a movable base station and install a repeater. Thus it is possible to effectively reduce movement costs of equipment and personnel as came up with such base station dispatch and repeater installation and also labor expenses while providing an ability to immediately respond to a rapid traffic increase. This makes it possible to shorten the length of a time for generation of communication failures due to congestion and also improve the convenience of users.

Other objects, features and advantages of the invention will become apparent from the following description of the embodiments of the invention taken in conjunction with the accompanying drawings.

BRIEF DESCRIPTION OF THE DRAWINGS

FIG. 9 shows a user channel assign table owned by a base station.

DETAILED DESCRIPTION OF THE EMBODIMENTS

Figure 1:
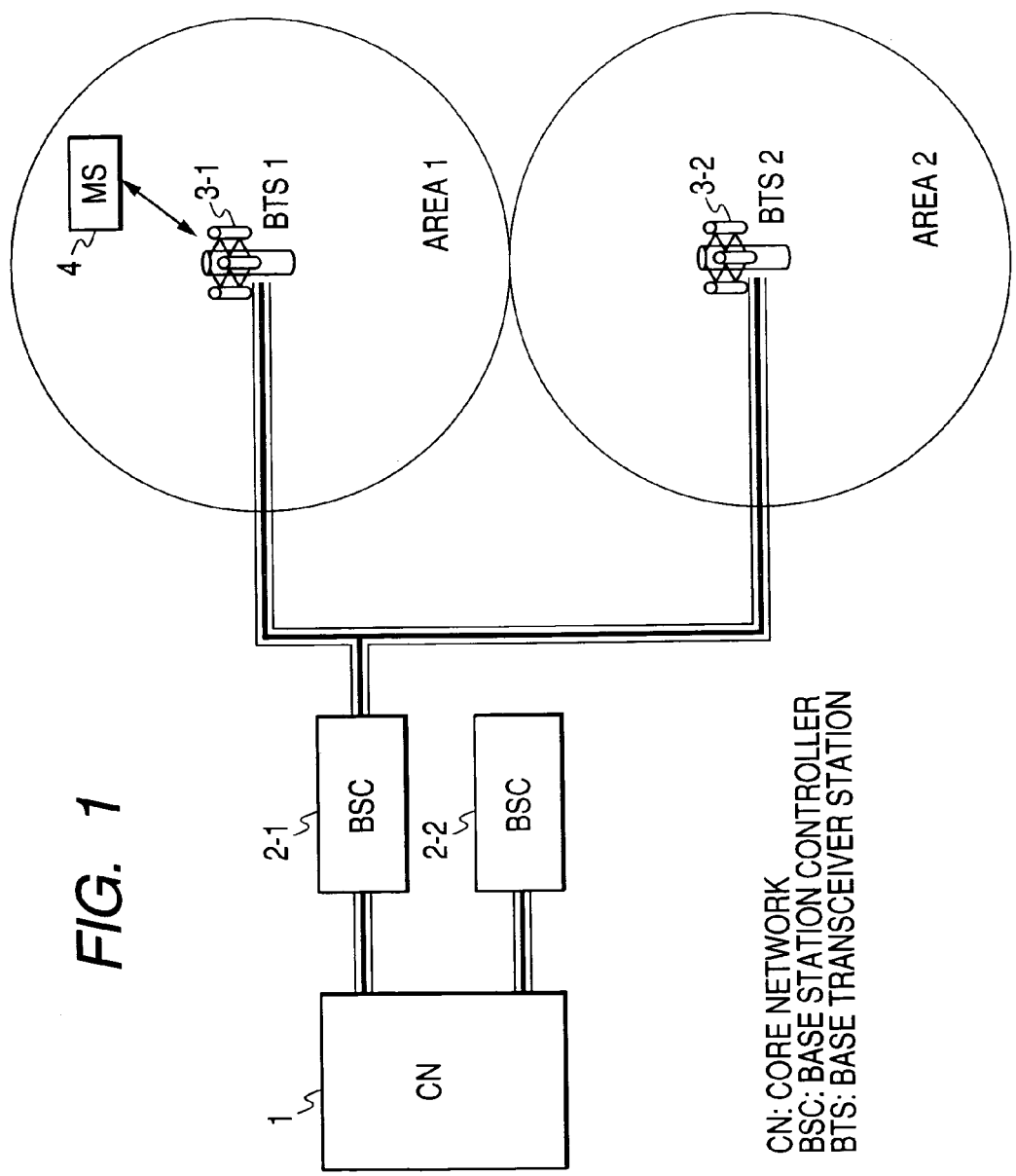
FIG. 1 is a diagram showing a network configuration of a cellular system.

FIG. 1 shows a network configuration of a cellular communication system. A core network 1 is operable to deal with position registration and attestation and accounting services of subscriber terminals, such as cellular phones, and also perform the routing of data and audio/voice signals. A base station control device 2 is equivalent in functionality to a radio network controller (RNC) or a base station controller (BSC), for performing voice transfer rate conversion and the assignment of a radio channel to a terminal in accordance with a call-in from another terminal or a call-out from the terminal that is present in an area which is managed by the base station control device. A base station 3 corresponds to a base transceiver station (BTS), for applying encoding and modulation to the data or voice signals as sent from the base station control device 2 and for performing communication with a terminal 4 by using a radio link. Adversely, for data and voice signals as sent via a radio link from the terminal 4, the BTS performs demodulation and decoding processing and then sends the resultant signals to the base station control device 2.

Figure 2:
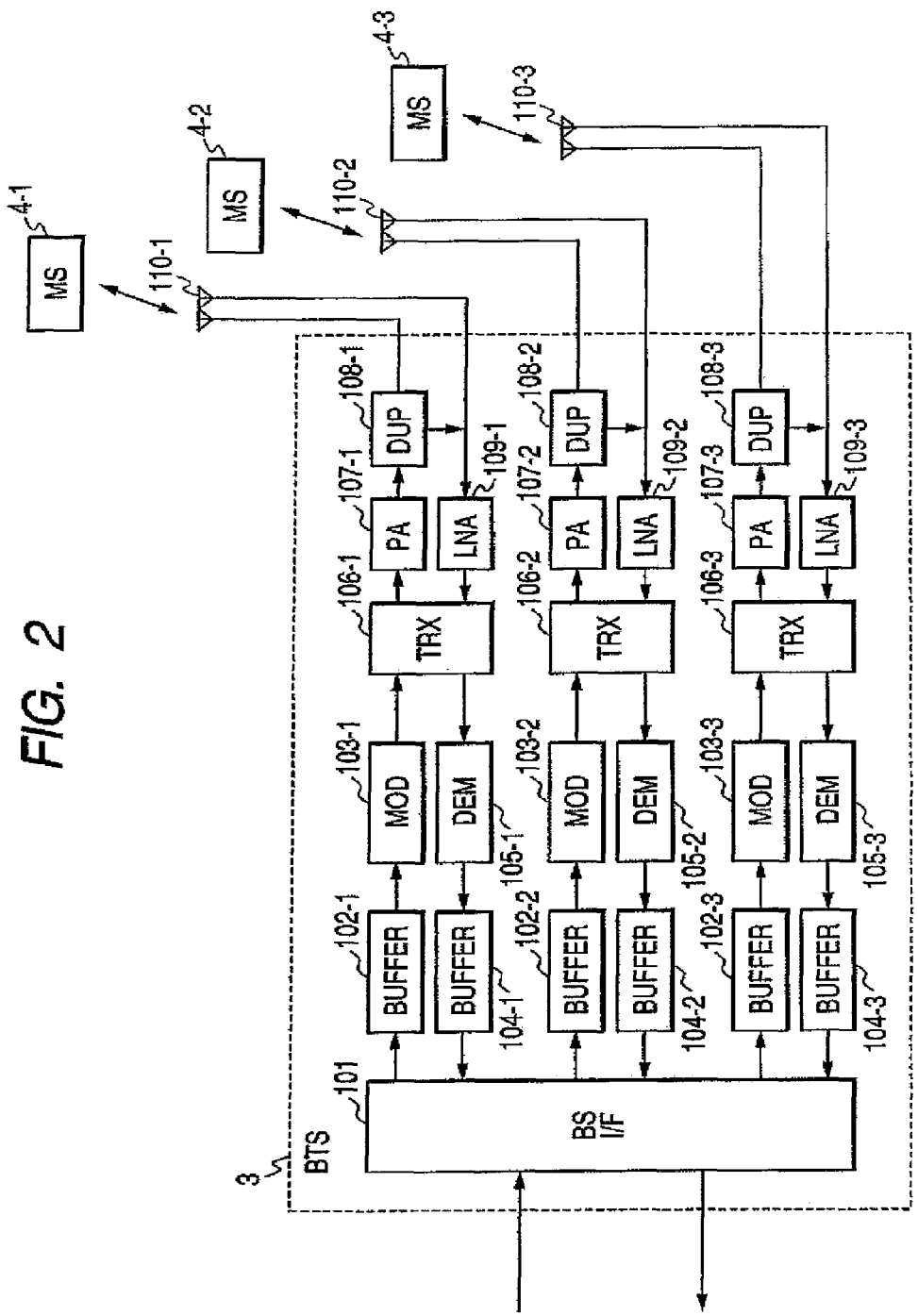
FIG. 2 shows a configuration of a prior known base transceiver station.

FIG. 2 shows a prior known example of the base station 3 of three sectors. A base station interface unit (BS_I/F) 101 is an interface module associated with the base station control device, which is a firmware that performs format conversion of transfer data. Asynchronous transfer mode (ATM) transmission is done between the base station control device and base station. As the data coming from the base station control device to the BS_I/F 101 has a format of ATM cells, it generates based thereon a frame signal prior to division into ATM cells, and then store a result in a buffer 102. The data sent from the BS_I/F 101 to the base station control device is read out of the buffer 104 and then divided into a plurality of ATM cells for transmission.

Each buffer 102 is a memory that temporarily stores or "records" a down-going or downbound signal to be sent from the base station control device in the form of a sequence of logical "0" and "1" bits. In buffers 102-1, 102-2 and 102-3, user data and control signals are stored, which are read out by modulator units (MOD) 103-1, 2, 3, respectively. These modulators 103-1, 2, 3 are prepared in units of sector-identifying scramble codes (e.g., PN codes) so that the user data and control signals being stored in the buffers 102-1, 2, 3 are divided on a per-sector basis, wherein a sector becomes a receiving end or "destination." A task of distributing transmission signals in units of sectors is performed by the BS_I/F 101. This is realizable by referring to a destination terminal ID of the user data and control signal and also the information specifying that this terminal ID is channel-assigned to which one of the sectors. An example is a "TrafficChannelAssignment" message, which is prescribed in 3rd Generation Partnership Project 2 (3GPP2) C.S0024-A, "cdma2000 High Rate Packet Data Air Interface Specification," pp. 9-94, 9-95 and 13-45, Mar. 31, 2004.

The modulator (MOD) 103 is a firmware that performs error correction coding and modulation for the bit sequence of data/voice and control signals to be input from the buffer 102. Quadrature encoding (e.g., Walsh coding) is used to multiplex the per-user data signal. Furthermore, the control signal also is subjected to the quadrature coding so that it is orthogonal to the user data signal. Further, PN code bit sequence is subjected to multiplication in order to reduce the correlation of down-bound signals between sectors and cells. In other words, an output of MOD 103 is a complex-based band signal with a PN code being multiplied to the one resulting from Walsh-code multiplexing of the modulated per-user signal and control signal. A configuration of MOD 103 will also be explained in FIG. 4.

A radio transmit-receiver or "transceiver" (TRX) circuit 106 is a hardware which performs both conversion between digital and analog signals and conversion between a base band and a carrier wave band. A power amplifier (PA) 107 is a hardware for amplifying a down-bound signal to be sent toward a terminal. A duplexer (DUP) 108 is for distributing downbound and inbound signals. This is a hardware that is used to transmit a downbound signal via a single antenna and receive an inbound signal by a couple of antennas. A low-noise amplifier (LNA) 109 is a hardware used to amplify the inbound signal. A respective one of transmit/receive antennas 110-1, 2, 3 is for transmitting a downbound signal toward a sector and for receiving an inbound signal coming from a terminal MS 4-1, 2, 3, which is present in each sector. In this prior art shown herein, a single antenna is used during downbound signal reception whereas two antennas are used during inbound signal reception owing to cooperative assistance of the duplexer. A demodulator unit (DEM) 105 is a firmware which applies demodulation and error-correction decoding to the inbound signal that was converted by TRX 106 from a radio frequency (RF) signal to a complex base band signal. Data and control signals with a sequence of "0" and "1" bits as output therefrom are written into a buffer 104. This buffer 104 is a memory for storing the decoded inbound signal in the form of a bit sequence of "0"s and "1"s. The bit sequence thus written is converted by BS_I/F 101 to have the ATM cell format, which is then sent forth toward the base station control device.

Figure 3:
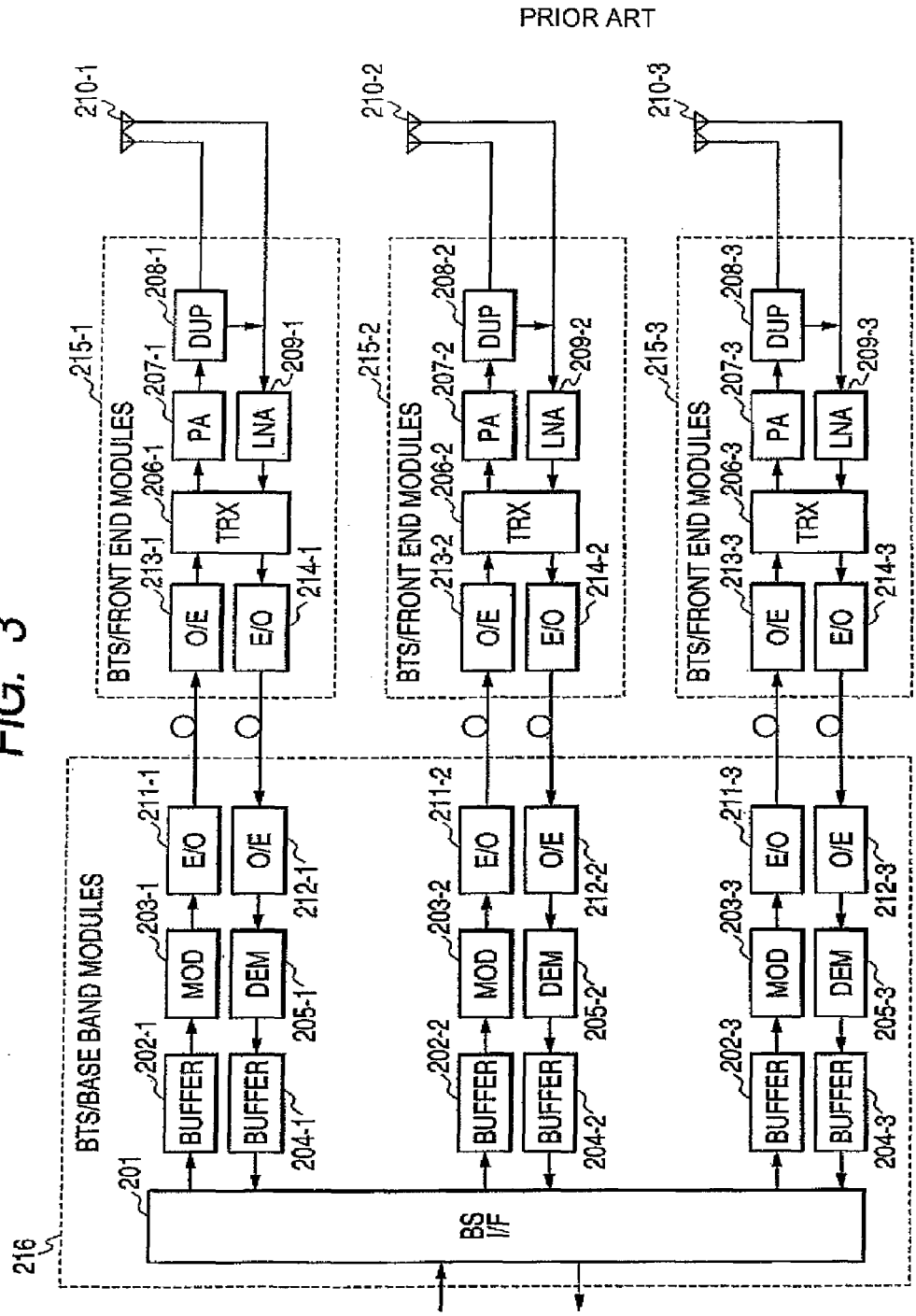
FIG. 3 shows a configuration which applies the radio on fiber (ROF) technology to the prior art base station.

FIG. 3 shows an example that applies a radio on fiber (ROF) technique to the prior art base station. A base station interface (BS_I/F) 201 is similar in functionality to the BS_I/F 101 of FIG. 2; buffers 202 are similar in function to the buffers 102 of FIG. 2; MODs 203 are similar to the MODs 103 of FIG. 2; buffers 204 are to the buffers 104 of FIG. 2; DEMs 205 to the DEMs 105 of FIG. 2; TRXs 206 to TRXs 106 of FIG. 2; PAs 207 to PAs 107 of FIG. 2; DUPs 208 to DUPs 108 of FIG. 2; and, LNAs 209 to LNAs 109 of FIG. 2.

An advantage of introducing the ROF technique is that it is possible by communicating a base band signal among MOD, DEM and TRX via an optical fiber to divide the base station into two parts: a base band processing unit 216, and a front end unit 215. Dividing in this way eliminates the need to settle base-band processor units at cell centers on a per-cell basis, thereby enabling many baseband signal processors to be put together at a single location. This in turn makes it easier to implement this invention.

For application of the ROF technique, an optical fiber cable is railed between the MOD 203, DEM 205 and TRX 206. Also equipped are an electro-optical (E/O) converter 211 which processes a modulated downbound baseband signal so that an electrical signal is converted into an optical signal, an opto-electrical (O/E) converter 213 which reconverts the optical signal to an electrical signal and then extracts the original modulated baseband signal, an electro-optical (E/O) converter 214 that converts an electrical inbound baseband signal as taken out of TRX 206 to an optical signal, and an opto-electrical (O/E) converter 212 that reconverts the optical signal to an electrical signal.

Figure 4:
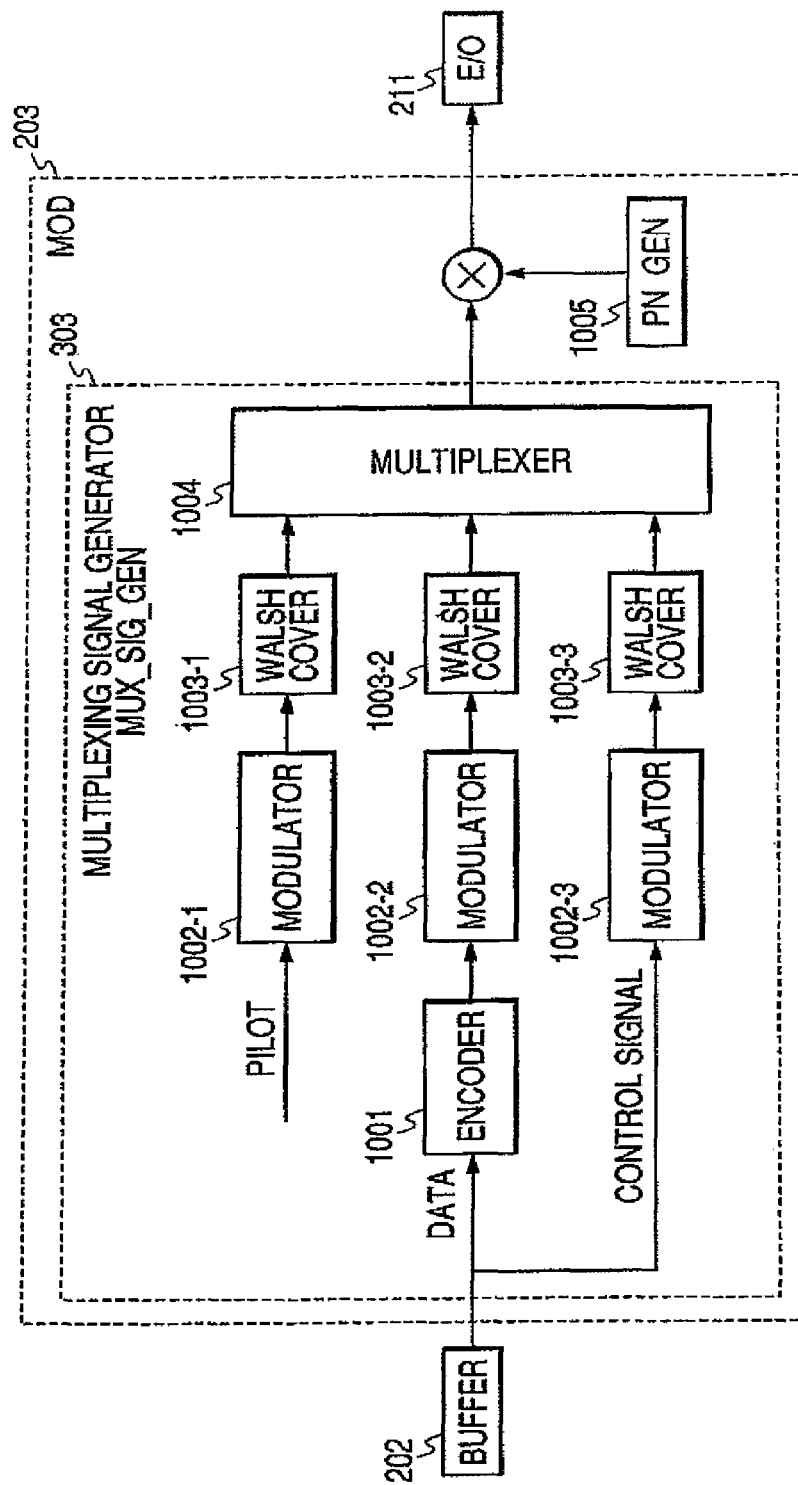
FIG. 4 depicts a detailed configuration of a modulation unit.

FIG. 4 is a diagram showing in greater detail a configuration of the MOD 203. It receives user data and voice and control signals from a buffer 202 associated therewith. The user data and voice signal of such input signals are passed to an encoder 1001 for execution of error correction coding, and are then output with a redundant bit sequence being added to the input bit sequence. The coded user data and the voice and control signals along with a pilot signal with its all bits of "0"s are input to modulators 1002-1 to 1002-3, respectively, and then applied modulation such as phase shift keying (PSK), quadrature amplitude modulation (QAM) or else. From each modulator 1002, a complex signal with its bit sequence modulated is output. At Walsh covers (Walsh code multipliers) 1003-1, 2, 3, Walsh coding is applied so that any two of the pilot signal, all-user common control signal, each user's data, voice signal and control signal are orthogonal to each other. At a channel multiplexer unit 1004, multiplexing is done for the pilot, control and voice signals and the user data that are mutually orthogonal due to the Walsh coding. All inputs may be simply added together and code-multiplexed; alternatively, the user data and the pilot, control and voice signals may be time-multiplexed. Here, circuitry which performs the processing of from the data/signal input to the output of the multiplexer 1004 is defined as a multiplex signal generator (MUX_SIG_GEN) unit 303. A pseudo noise code generator (PN_GEN) 1005 generates a scramble code or codes which become lower in mutual correlation between the MODs 203. For example, at all the MODs 203, use the same register to generate the same PN code, and then deviate an offset amount of the PN code per MOD 203 for later use, whereby it is possible to lower the mutual correlation between PN codes to be generated by PN code generator (PN_GEN) 1005 between MODs 203. A scramble code generated by the PN_GEN 1005 is multiplied with an output of the multiplexer 1004, for input to E/O 211.

The number of those user channels which can be accommodated by using a single scramble code (for example, fifty nine) is determined by the number of Walsh codes as generated by the base station (e.g., sixty four). The Walsh codes thus generated are distributed to a pilot channel, a control signal-use channel, and a user channel. Accordingly, in case a one scramble code is assigned to each front end unit in the configuration shown in FIG. 3, an area in which communication is made using a scramble code unique thereto is formed with respect to the communication range of each front end unit. A result of this is that one hundred and seventy seven (177) user channels are accommodable in an entirety of the base station and base band signal processor. This can be said because the number of user channels per scramble code is fifty nine (59), and the scramble code number is three (3), and thus 59 times 3 is 177.

Figure 5:
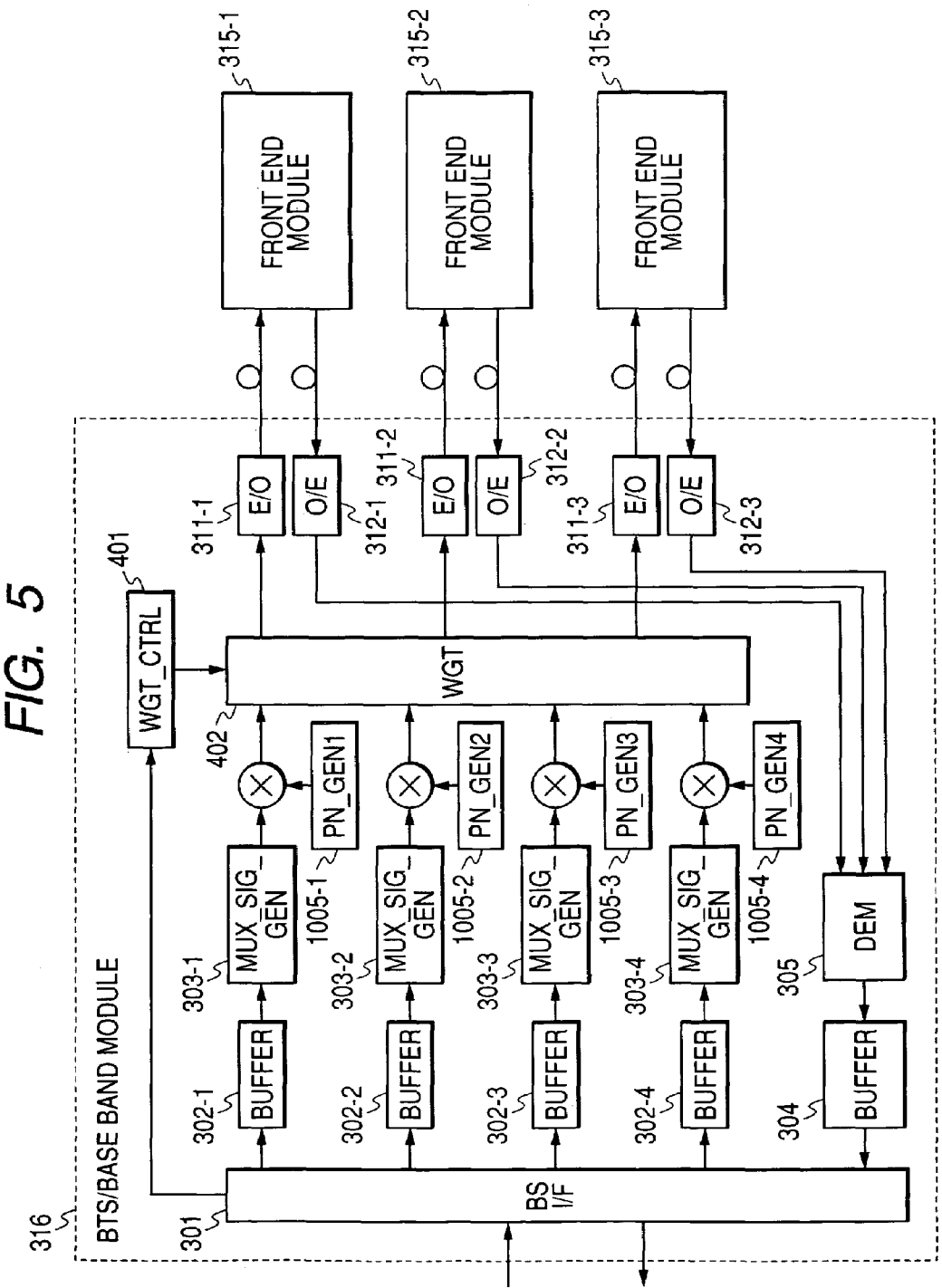
FIG. 5 is an embodiment of a base station apparatus in accordance with this invention.

FIG. 5 shows an embodiment of the base station in accordance with this invention. Buffers 302 are similar in functionality to the buffers 202 of FIG. 3; a buffer 304 is similar in function to the buffer 204 of FIG. 3; E/Os 311 are similar to the E/Os 211 of FIG. 3; O/Es 312 are to the O/Es 212 of FIG. 3; and, front end units 315 are to the front end units 215 of FIG. 3. A BS_I/F 301 sends and receives information to and from a weight control unit (WGT_CTRL) 401, in addition to the functions owned by the BS_I/F 201 of FIG. 3. Such data exchange with WGT_CTRL 401 will be described later. Multiplex signal generator (MUX_SIG_GEN) units 303 are such that each is similar to that shown in FIG. 4. Pseudo-noise code generators (PN_GEN) 1005-1 to 1005-4 generate scramble codes PN1-PN4, respectively, in order to set up areas for performing communication using different scramble codes. In this embodiment, since the number of scramble codes which are made active in accordance with a required number of channel assign events, it is also possible for the buffer 302 and MUX_SIG_GEN 303 plus PN_GEN 1005 to operate only when a corresponding scramble code is in the active state.

In the arrangement of FIG. 5, communication using four scramble codes is enabled. Consequently, supposing that the use of each scramble code permits accommodation of fifty nine (59) user channels, it is possible by using all available scramble codes to accommodate a total number of 59×4=236 of user channels in maximum. A technique for activating communication using which one of the scramble codes and methods of determining a communication area using each scramble code and of realizing the setup of each area will be described later.

Here, the relationship of an area and a scramble code along with a front end unit is clarified. The scramble code and the area are in one-to-one correspondence. A geographical region in which a terminal that communicates using a certain scramble code is present, that is, a geographic zone capable of receiving the scramble code at the terminal with the strongest electrical power, is defined as an area corresponding to this scramble code. The front end unit is a radio transceiver on the base station apparatus side, which sends and receives one or a plurality of scramble code signals to and from the terminal. When the base station apparatus sends forth a plurality of scramble code signals, weighting is applied per scramble code, resulting in transmission of a scramble code-multiplexed signal. Such scramble code weighting multiplexing is carried out in a procedure which follows.

The WGT 402 uses a weight matrix, which is represented by Equation 1 to be later presented, to perform weighting processing so that those signals scrambled by four scramble codes are sent from three front end units. More precisely, upon inputting of an output of MUX_SIG_GEN 303 which is multiplied with a scramble code generated by PN_GEN 1005, weight combining is applied thereto for output to E/O 311. Here, let the input base band signals be $x_1(t)$, $x_2(t)$, $x_3(t)$ and $x_4(t)$, while letting the output baseband signals $y_1(t)$, $y_2(t)$, $y_3(t)$, $y_4(t)$, respectively. Then, the input/output relationship of WGT 402 is given by the following Equation 1:

$$\begin{bmatrix} y_1(t) \\ y_2(t) \\ y_3(t) \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \end{bmatrix} \begin{bmatrix} x_1(t) \\ x_2(t) \\ x_3(t) \\ x_4(t) \end{bmatrix} \quad (1)$$

In prior art base stations, the weight matrix becomes a square matrix with its diagonal terms being 1 and with the other factors being set at 0. This means that a single scramble code is assigned to a single area. The present invention is characterized by offering an ability to freely control respective terms of this weight matrix. The weight matrix need not be a diagonal matrix. In addition, even when the number of inputs is greater than the number of outputs, the handleability required is still attainable by letting the weight matrix be a non-square matrix.

$$\begin{bmatrix} y_1(t) \\ y_2(t) \\ y_3(t) \end{bmatrix} = \begin{bmatrix} 1 & 0 & 0 & 0.5 \\ 0 & 1 & 0 & 0.5 \\ 0 & 0 & 1 & 0.5 \end{bmatrix} \begin{bmatrix} x_1(t) \\ x_2(t) \\ x_3(t) \\ x_4(t) \end{bmatrix} \quad (2)$$

For example, consider a weight matrix as given by Equation 2 above. Here, a respective one of factors $w_{14}$, $w_{24}$, $w_{34}$ for use as the weighting coefficients of an input $x_4(t)$ that corresponds to a scramble code PN_4 is set at 0.5. Accordingly, the output baseband signals $y_1(t)$, $y_2(t)$, $y_3(t)$ become the ones that include a signal corresponding to the scramble code PN_4 with its weight of 0.5 with respect to signals "1" corresponding to scramble codes PN_1, PN_2, PN_3, respectively. Whereby, a radio-frequency (RF) signal with the scramble code PN_4 applied thereto is sent from the front end units 315-1 to 315-3. As a result, it is possible to form an area in which a total of received electrical power in the case of RAKE-receiving the scramble code PN_4-applied RF signal as sent from each front end unit is greater than the received power of an RF signal using another scramble code, at or near a land point whereat the distance from each front end unit becomes equivalent (see FIG. 15).

Figures 11, 12:
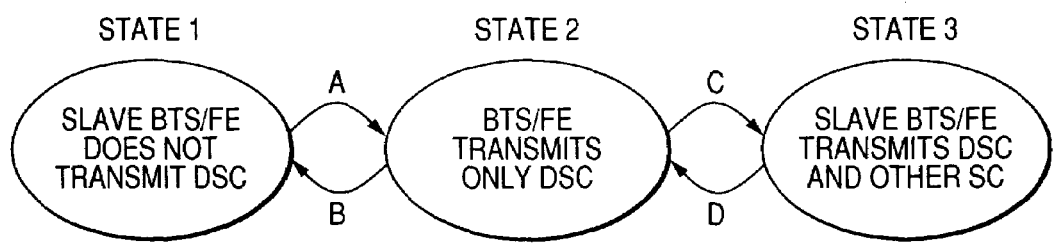
FIG. 11 is a state management table per front end unit.
FIG. 12 is a state transition diagram.

The WGT_CTRL 401 determines the weight in accordance with a state transition chart shown in FIG. 12 and also flow charts shown in FIGS. 16 to 19. For letting it be a trigger of state transition, conduct a search to specify how many "vacant" user channels are presently available for each scramble code (e.g., PN code). At BS_I/F, analyze a message that is sent from the base station control device and reaches the BS_I/F, which message is comparable to the "TrafficChannelAssignment" message stated supra. Then, read out the assign information of user channels. Next, generate a user channel assign table shown in FIG. 9.

Figure 6:
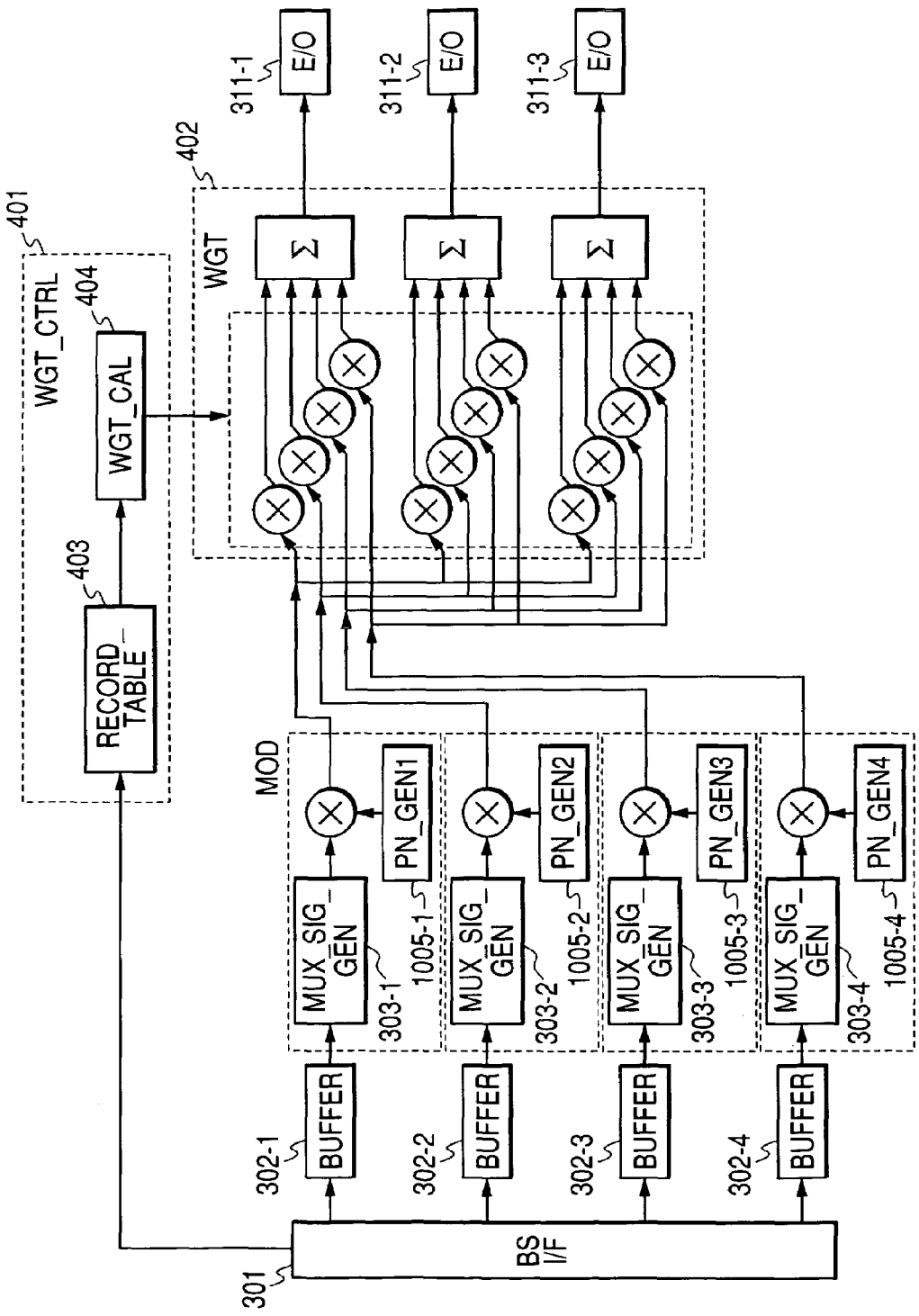
FIG. 6 is an embodiment of a weighting unit in accordance with the invention.

FIG. 6 is a diagram which clarifies a connection of the weighting combiner (WGT) 402 and the weight controller (WGT_CTRL) 401 along with peripheral circuitry thereof. The WGT_CTRL 401 is made up of a weight control-related memory (TABLE_RECORD) 403 which stores therein the above-noted user channel assign table and a state management table per front end unit as will be explained in FIG. 11, and a weight calculator unit (weight controller) WGT_CAL 404 which determines each factor of the weight matrix in accordance with flowcharts shown in FIGS. 16 to 19 while referring to the two tables stored or "recorded" in the memory. An output from WGT 402 to E/O 311 is a baseband signal after completion of weighting combining for four inputs. The weight is determined depending upon the state of each area. Details will be described at the part of an explanation with reference to FIG. 11. The user channel assign table is managed based on a monitor result of user channels by means of BS_I/F. In the state management table per front end unit, respective factors of the weight matrix are stored, which are determined by the weight calculator WGT_CAL 404 based on this monitor result. BS_I/F refers to scramble codes and terminal IDs of the user channel assign table and determines that the data being sent to each terminal is written into which one of the buffers 302.

Figure 7:
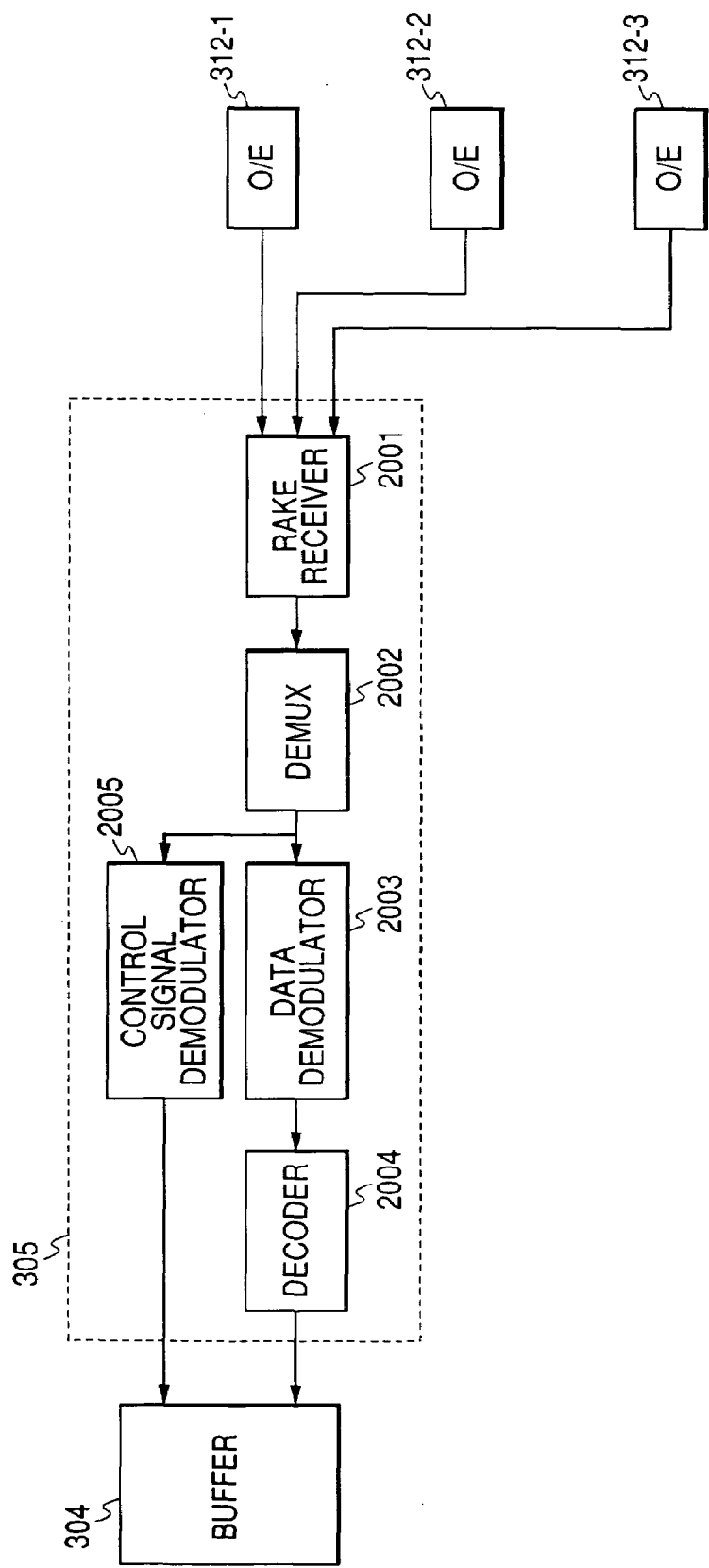
FIG. 7 is a detailed configuration of a demodulation unit.

FIG. 7 is a diagram showing in detail a configuration of the DEM 305. An up-going or inbound signal is converted into a base band via TRX from a reception antenna of each front end unit, and then sent from the front end unit to baseband signal processor unit by way of its associated optical fiber cable. The baseband signals received at respective front end units are input in parallel to DEM 305. Respective parallel-input baseband signals received are combined together by RAKE combining at a RAKE combiner 2001. The RAKE combining is a per-terminal processing operation, wherein a need is felt to decode the scramble code to be applied by a terminal. Based on the ID of an area in which the terminal exists and the ID of such terminal, generate the same one as the scramble code generated by the terminal. Then, use the same scramble code to perform wave detection at a pilot and timing detection, thereby carrying out the RAKE combining. Additionally, by applying cite diversity combining to the received signals after completion of the RAKE combining as input in parallel to the DEM 305, it is possible to increase the inbound signal in its signal-to-interference power ratio (SIR). This can be said because those baseband signals being received at a plurality of front end units are regardable as site diversity branches.

At a demultiplexer (DEMUX) 2002 (channel separator), separate a pilot signal and a user-aimed data signal plus a control signal from the received RAKE-combined baseband signal. According to the above-cited standardization document (3GPP2, C.S0024-A, "cdma2000 High Rate Data Air Interface Specification"), in the cdma2000 protocols, these inbound pilot, control and data signals are all multiplexed together in a code field so that multiplying an appropriate Walsh code enables separation of the data and control signal that are sent by the terminal. At a control signal demodulator unit 2005, remove the modulation of such separated modulation control signal. At a data demodulator 2003, remove the modulation of the inbound user data signal (also including voice/audio components). At an error-correcting decoder 2004, perform error correction decoding of the modulation-removed inbound baseband signal. The demodulated and decoded signal (bit sequence) from the terminal is written into a buffer 304 of FIG. 7.

Figure 8:
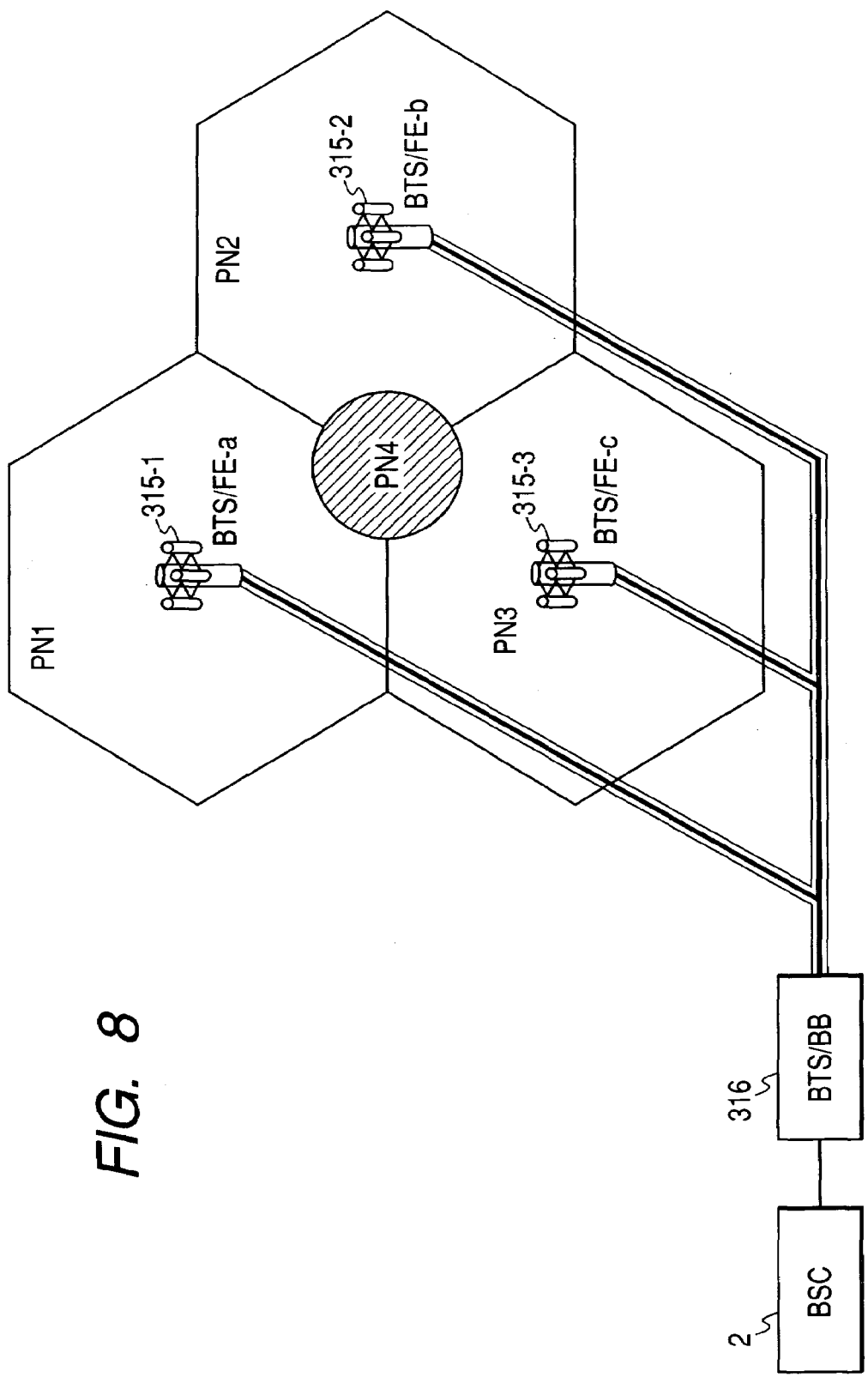
FIG. 8 is a conceptual diagram for explanation of a weight control method.

FIG. 8 is a conceptual diagram showing a base band signal output method in accordance with this invention. A baseband signal processor 316 of base station is connected by optical fiber cables to a plurality of front end modules 315, resulting in three areas being formed by means of radio waves as output from respective front end units 315-1, 315-2, and 315-3. Although in the prior art a single scramble code (e.g., PN code) is output to a single area, this invention is such that the fourth PN code is output in parallel from each front end unit, thereby generating at an area boundary a scramble code-different area (i.e., the region capable of receiving the fourth PN code with the highest received power by the RAKE reception at the terminal). With such an arrangement, it is possible to set up a new area without the need to increase the number of front end units and also to increase the number of user channels within three hexagonal areas. This makes it possible to accommodate an increased number of users.

FIG. 9 shows one example of the user channel assign table to be generated by the baseband signal processor of the base station. In the code division multiple access (CDMA) architecture, scramble codes (e.g., PN codes) are assigned in units of areas in such a way as to lower the mutual correlation of inter-area signals while assigning within an area the Walsh codes that are different on a per-terminal basis, thereby sustaining the orthogonality between terminal signals. The Walsh codes employable at this time are the ones that define user channels. It is the user channel assign table that indicates in toto each user channel is assigned to which terminal and how many user channels are available for each scramble code.

The user channel assigning task per se is performed by the base station control device. Based on a cell search result indicating that the terminal of interest can receive which one of the scramble codes with the strongest power, an attempt is made to assign to the terminal a user channel which is presently available for use with this scramble code. The assigned result is sent to a movable station terminal as a control signal (e.g., "MACIndex" and "PNOffset" fields of TrafficChannelAssignment message); thus, compiling this information makes it possible to generate the table of FIG. 9. The number of available channels (NAC) is a numerical value resulting from subtraction of those for pilot/control signal use and those assigned to respective users from a total number of channels involved. In FIG. 9, let the number of user channels (Walsh codes) being assigned to the users at respective scramble codes be four (4), and the table records therein the IDs of terminals being assigned to respective user channels. The available user channel number is updated, once at a time, whenever BS_I/F receives a control signal (e.g., "TrafficChannelAssignment" message) indicating an assignment result.

Figure 10:
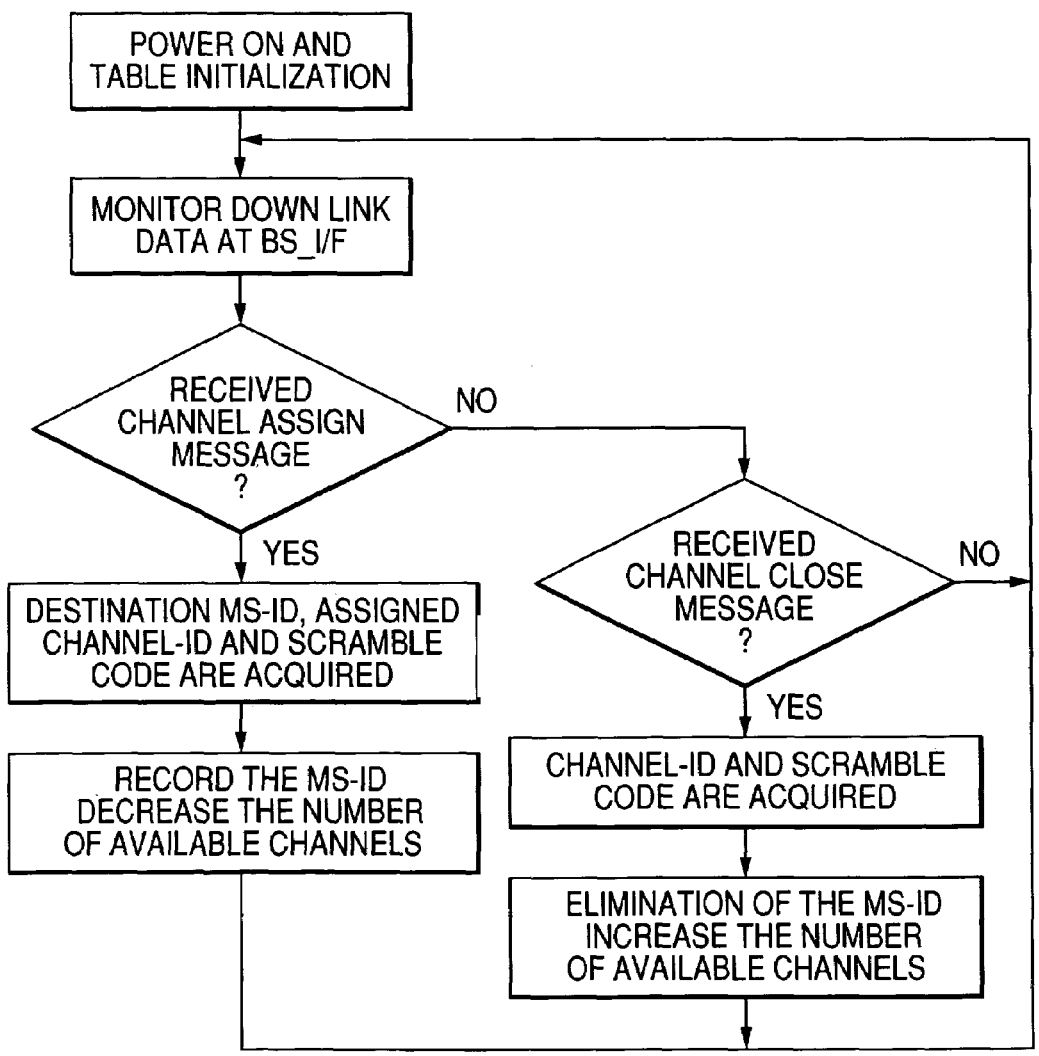
FIG. 10 is a flow diagram of preparation of the user channel assign table.

FIG. 10 is a flow diagram showing a procedure for generating the user channel assign table of FIG. 9. Immediately after power-on of the base station, the table is initialized resulting in the available channel number becoming maximal for every scramble code. The BS_I/F monitors down-bound signals. Upon detection of a message for assigning a user channel to a terminal, read the terminal ID of a destination and an assigned scramble code along with a user channel number, which are added to the table. Simultaneously, reduce the available user channel number by a degree corresponding to a newly assigned one(s), followed by overwrite thereof. If the detected message is the one that closes the user channel (channel turn-off), read the number of user channels to be closed along with their scramble codes and then delete the user channel ID from the table while increasing the available user channel number by a degree equivalent to the closed one(s).

FIG. 11 is a state management table of front end module (FE unit), which is generated by WGT_CAL of the base band signal processor of the base station. This table is stored in the RECORD_TABLE, which is a memory. This table indicates IDs of FE units, default scramble codes (DSCS) to be output immediately after power-on at respective FE units, output levels in units of scramble codes (SCs) at respective FE units, dependency relation showing an output relationship of the scramble codes, output states on a per-FE basis, and IDs of neighboring FE units.

The FE unit IDs, the DSCs and the IDs of neighboring FE units are hardly updated during an operation of the base station. In a column of the per-SC outputs, control results in virtue of the weight controller WGT-CTRL are recorded. The dependency relation is defined in a way which follows: when the same PN is presently output at a plurality of FE units, an FE unit that uses this PN as its DSC is regarded as "Master"; an FE unit which uses another PN as its DSC and which presently outputs this PN in a so-called "borrowed" fashion is defined as "Slave." The information as to such Master and Slave indicates the relationship between FE units. The FE unit states indicate a scramble code output status at each FE unit. Two types of a state No. 1 are present, one of which is a state-1/Slave equivalent to a state that does not output any DSC and outputs another PN, and the other of which is a state-1/Master using this PN as its DSC. A state No. 2 is the one that outputs only the DSC. Regarding a state #3, two kinds of states are present: a State-3/Slave which outputs both DSC and another PN at a time, and a State-3/Master using this PN as its DSC. Immediately after power-on, the state of each FE unit is at the level 2.

Although in the above explanation the FE units are three while the maximum number of scramble codes is set at four (4), similar results are obtainable even when using other values if the maximum number of scramble codes is greater than the number of FE units used. This is involved in the scope of the invention.

A state transition chart of these front end modules (FE units) is shown in FIG. 12. There are three states and four state transitions. These will be explained while referring to FIGS. 13 to 19. Here, a weighting scheme will be discussed below. The weight is determined depending on the state of FE unit in a way which follows.

(i) At an FE unit of the state 1 and "Master," define the weight of DSC as "1" while setting the weights of the remaining SCs to "0."

(ii) At an FE unit of the state 1 and "Slave," define the weight of SC being borrowed from Master as 1, and set to 0 the weight relative to the other SCs including DSCs.

(iii) At an FE unit of the state 2, let the DSC weight be 1, and set the weights of the other SCs to 0.

(iv) At an FE unit of the state 3 and Master, let the DSC weight be 1, and let the other SC weights be 0.

(v) For an FE unit of the state 3 and Slave, let the DSC weight be 1, and let the weight of SC lent from Master be less than 1. Set the weight of the other SCs to 0.

Figures 13A, 13B:
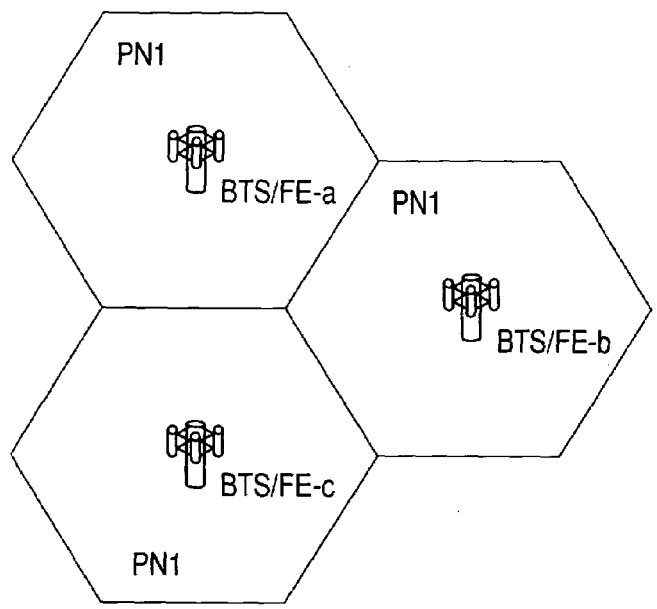
FIGS. 13A and 13B are diagrams for explanation of a state 1 according to the invention.

FIGS. 13A and 13B are diagrams for explanation of the state 1 of front end module (FE unit). The state 1 is such that a plurality of base station FE units are outputting the same scramble code as shown in FIG. 13A. In this case, a single scramble code is used to cover a plurality of areas which are less in number of terminals while merging these areas into a single area to thereby save the use of scramble codes. In other words, owing to the base station functionality due to the three FE units, it functions to form a single cell. More specifically, it is possible to reserve the scramble codes for laser use and also to lend them to other access-crowded areas. While default scramble codes (DSCs) are assigned to three FE units as shown in FIG. 13B, this is the state that areas "b" and "c" fail to output DSCs since every area is outputting only the PN1. As this state is a state in which an FE unit "a" has lent PN1 that is the DSC to the other FE units "b" and "c," these are in such a relation that the FE unit a functions as "Master" whereas the FE units b, c are "Slave." In view of the fact that the Slave FE units b, c output no DSCs, these FE units are set in the state 1. The FE unit a which acts as Master with respect to the state-1/Slave FE units is also set to the state 1.

A state transition to the FE state 1 is controlled by the weight controller WGT_CTRL 401 shown in FIG. 5. A method for controlling a state change of from the state 2 to state 1 will be described later. When the FE state is at 1, the same scramble code is output from a plurality of FE units. In this event, there must exist a base band signal of a scramble code which is output from none of the FE units. Although FIG. 5 assumes the use of certain circuitry which generates baseband signals of four scramble codes (including the buffer 302, MUX_SIG_GEN 303, PN_GEN 1005), baseband signal generation circuitry concerning the fail-to-output scramble code (in the table of FIG. 13B, a scramble code with a weight sum becoming zero when adding together the per-SC output weights for all the FE units) is rendered inoperative. When looking at from a terminal(s), the signal receive power per scramble code varies because the output power per scramble code changes due to the state transition of FE unit(s). A result of this is that hand-over processing takes place.

Figures 14A, 14B:
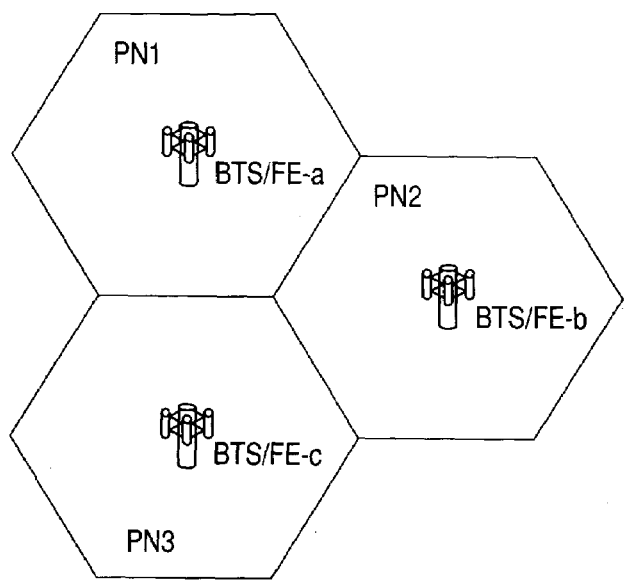
FIGS. 14A and 14B are explanation diagrams of a state 2 according to the invention.

FIGS. 14A and 14B are explanation diagrams of the state 2 of front end module (FE unit). The state 2 is such that a respective one of the three base station FE units is outputting DSC only as shown in FIGS. 14A-14B. After power-on of the base station, every FE unit is set in this state. As each FE unit does not borrows the DSC of another FE unit, each acts as Master. The state 2 features in that Slaves for Master are absent.

A state transition to the FE state 2 is controlled by the weight controller WGT_CTRL 401 in FIG. 5. A control method of transition from the state 1 to state 2 and also from state 3 to state 2 will be described later. When the FE state is at 2, the default scramble code is output from each FE unit. As previously described, the circuitry that deals with the fail-to-output scramble code is rendered inoperative. When looking at from a terminal, the signal receiving power per scramble code varies with a change in output power per scramble code due to a state transition of FE unit(s). As a result, hand-over processing occurs.

Figures 15A, 15B:
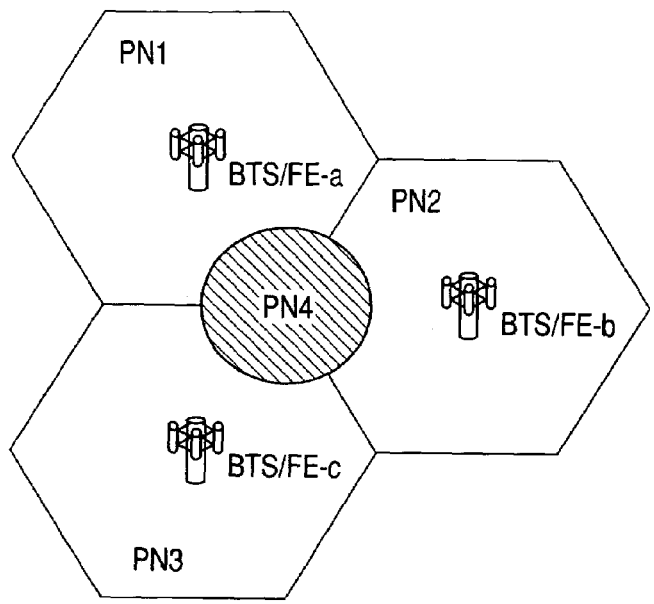
FIGS. 15A and 15B are explanation diagrams of a state 3 according to the invention.

FIGS. 15A and 15B are explanation diagrams of the state 3 of front end module (FE unit). State 3 is such that a plurality of FE units output DSCs respectively and further output another or other scramble code signals also. An attempt is made to increase the density of scramble codes and user channels at a crowded location, thereby increasing accommodable users in number. As apparent from viewing FIGS. 15A-15B, an area capable of receiving PN4 with the strongest power is created at a cell boundary, by outputting PN1 to PN3—each is DSC—from the FE units "a," "b" and "c" and, moreover, permitting each FE unit to output PN4 with electrical power which is the half of that of PN1, PN2, PN3. In other words, it is possible to add a user channel or channels to the communication regions (i.e., cover ranges of PN1, PN2 and PN3) prior to creation of the area of PN4, which in turn is effective at improving the user channel density in the communication regions stated supra. Although each area becomes Slave of PN4 at this time because it borrows PN4, Master is not present because any FE unit using PN4 as its DSC is absent. At this time, PN4 is handleable as an emergency scramble code for use in congestion events only. Letting multiple FE units output the PN4 in unison offers an effect of temporarily increasing the user accommodation number in a similar way to the installation of a movable base station. Obviously, if there is an FE unit using PN4 as its DSC, then its area becomes Master. In this way, both an FE unit that presently outputs DSC and another scramble code and an FE unit acting acts as its Master are set in the FE state 3.

A state change to the FE state 3 is controlled by the weight controller WGT_CTRL 401 in FIG. 5. A method for controlling transition from the state 2 to state 3 will be described later. When the FE state is at 3, each FE unit outputs its default scramble code and another scramble code in a multiplexed fashion. As previously stated, the base band signal generation circuitry concerning the fail-to-output scramble codes is rendered inoperative. When looking at from a terminal, the signal receive power per scramble code varies with a change in output power per scramble code due to the state transition of FE unit. As a result, hand-over processing occurs.

Figure 16:
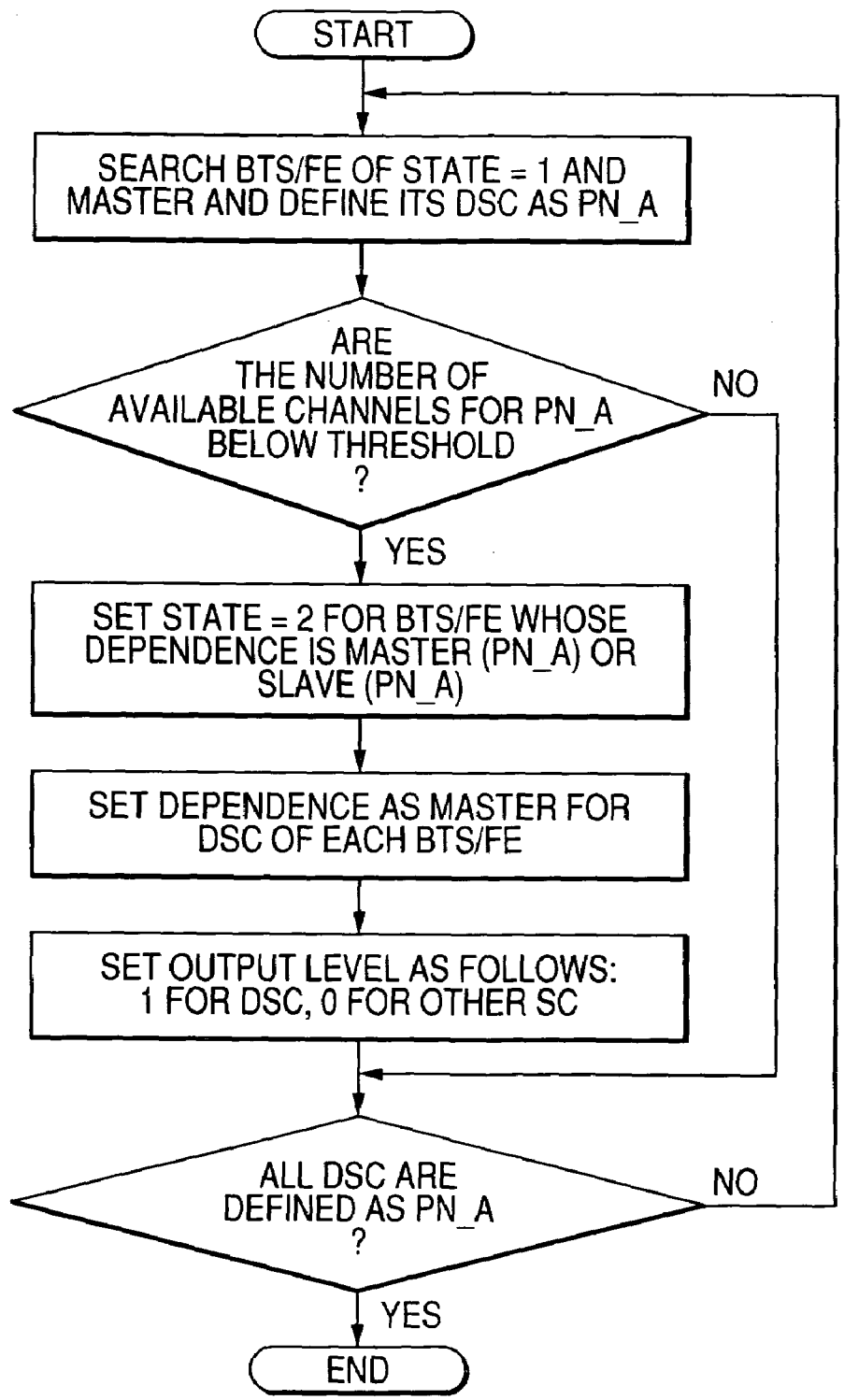
FIG. 16 is a flow of state transition "A" according to the invention.

FIG. 16 shows a process flow in BS_I/F during a state transition wherein the state of a front end (FE) unit changes from the level 1 to 2. Firstly, search the FE state management table to find therefrom an FE unit which is in the state 1 and which acts as Master. Then, specify its default scramble code (DSC). Suppose that the DSC thus specified is PN_A. Next, refer to the user channel assign table. In case the specified PN_A has its available user channel number which is less than a predefined threshold value, determine that the use of a single PN is incapable of covering a wide communication region. In the FE state management table, set those FE units having the DSC and acting as Master and Slave to the state 2. Then, clear the dependency relation of Slave. Regarding the DSC, set the output weight at each FE unit to 1 while setting it to 0 for the other scramble codes. Whereby, all the FE units of the state 1 that have been Master and Slave are forced to transit to the state 2. The processing above will be repeated with respect to all DSCs of those FE units of the state 1 and Master.

Due to the state transition stated above, the shape of an area transits from the one shown in FIG. 13A to that of FIG. 14A, while the FE state management table changes from that of FIG. 13B to FIG. 14B. More specifically, in the three hexagonal regions shown in FIG. 13A, prior to the state transition, the terminal of interest is capable of receiving PN1 with the strongest power in every region; however, after the state change, the terminal becomes able to maximally receive PN1, PN2, PN3 in the hexagonal regions, respectively. The terminal experiences a change in per-PN received power, and performs hand-off processing.

Figure 17:
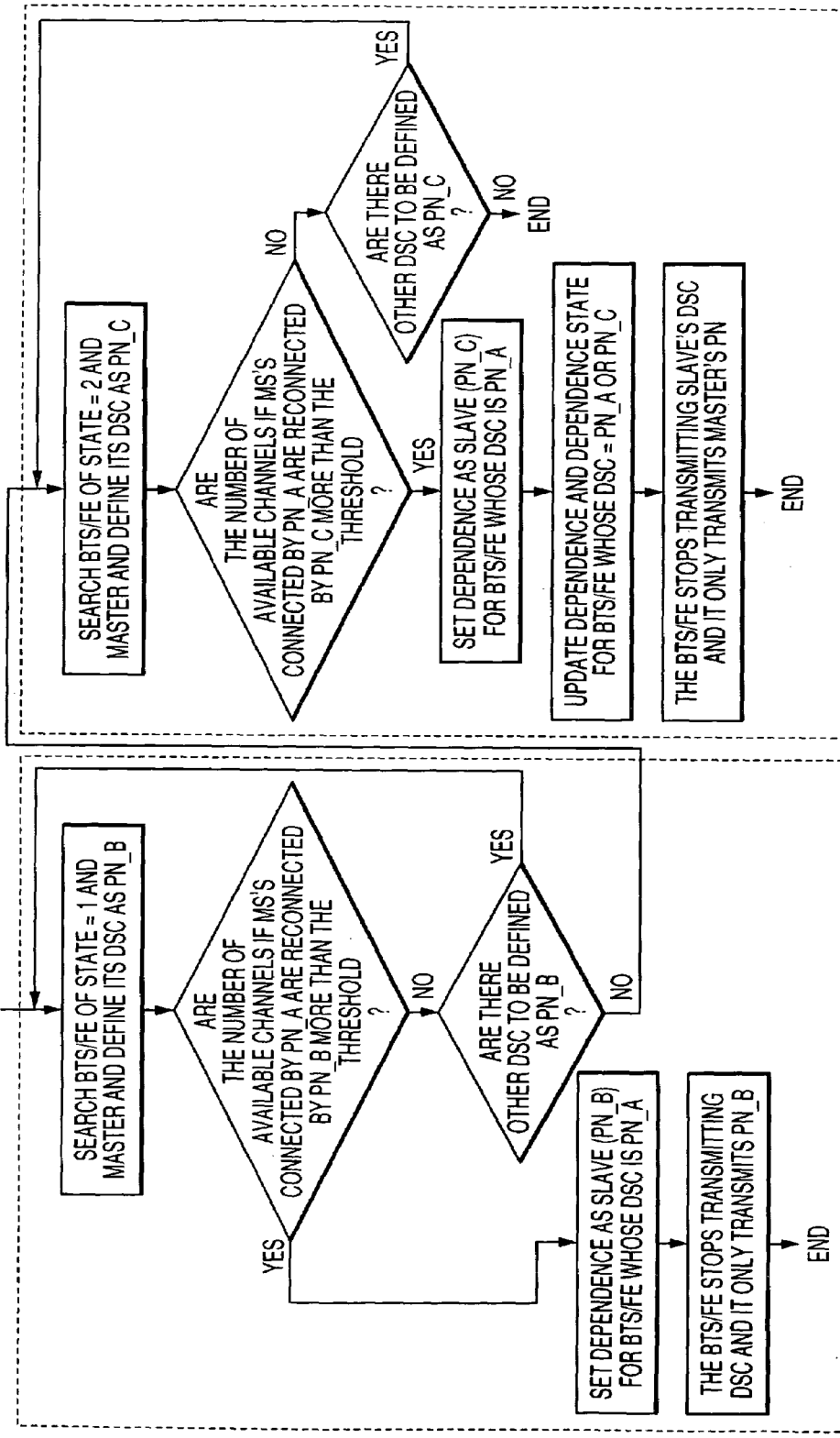
FIG. 17 is a flow of state transition "B" according to the invention.

FIG. 17 shows a flow of state transition wherein the state of a front end (FE) unit changes from 2 to 1. Determine whether a certain FE unit of the state 2 becomes the state 1. Define as PN_A a PN code which is used by this FE unit of the state 2 as its DSC. This flow is generally divided into two parts. One of them is a flow for adding an FE unit of the state 2 as Slave of the FE unit of the state 1. The other is a flow for combining together two FE units of the state 2 to thereby newly generate a relationship of Master and Slave of the state 1.

In the former, what is done first is to specify a single PN_B which is used as the DSC of a Master area of the state 1 from among those FE units being connected to the same base station apparatus. Next, perform threshold determination to find whether a free or "idle" one is present in available user channels of PN_B when assuming that a terminal of PN_A is shifted to PN_B. If the available user channels are judged to have such idle one, then perform the following setup in order to move a terminal belonging to PN_A to PN_B: let the dependency relation of an FE unit using PN_A as its DSC be set to Slave(PN_B); set the state of such FE unit at 1; set an output of PN_A at 0; and, set an output of PN_B at 1. With such setup, the purpose of the flow—that is, let the region of interest (i.e., region covered by the FE unit using PN_A as its DSC) change to the state 1—is accomplished; thus, the processing is brought to completion. This processing is sequentially applied for judgment to those scramble codes which are used as DSCs of any FE units of the state 1 and Master. If such processing results in the state of the FE unit failing to become 1, then consideration is given in the right side loop of the flow of FIG. 17 to determine whether the same PN-transmitting region is created between FE units of the state 2.

With the state transition stated above, the area shape is changed from that of FIG. 14A to FIG. 13A, and the FE state management table changes from FIG. 14B to FIG. 13B. In other words, in the three hexagonal regions shown in FIG. 14A, prior to the state transition, the terminal can maximally receive PN1, PN2, PN3 in these hexagonal regions respectively; after the state change, the terminal becomes able to maximally receive PN1 in every region. This operation is equivalent to the one with the PN_A of FIG. 17 being replaced by PN1 and also with PN_B replaced by PN3. The terminal experiences a change in per-PN received power, and executes handoff processing.

An explanation will be given of the right-side loop of FIG. 17. First, specify a single PN_C which is used as the DSC of an FE unit of the state 2 so that PN_A and PN_C are different from each other. Next, perform threshold judgment to determine whether an idle channel is present in the available user channels when assuming that the terminal of PN_A is shifted to PN_C. If the available user channels are judged to have such idle one, then define as Master an FE unit using as its DSC a scramble code that is inherently less in available user channel; set another to Slave. At the FE unit that became Slave, let an output of DSC be 0, and let an output of the DSC of the Master FE unit be 1. For both the Master and Slave FE units, the FE states are modified from 2 to 1. Here, the available user channel-less scramble code is defined as Master in order to lessen the number of terminals moving between scramble codes to thereby suppress or minimize the occurrence of a control signal(s) due to hand-over events. In this way, when the state of the FE unit using PN_A as its DSC becomes 1 or alternatively when the FE state becomes 1 after PNs of a plurality of state-2 regions are unified together into a single one, this procedure is terminated.

With the state transition above, the area shape is changed from that of FIG. 14A to FIG. 13A whereas the FE state management table changes from FIG. 14B to FIG. 13B. More specifically, in the three hexagonal regions shown in FIG. 14A, prior to such state transition, the terminal can maximally receive PN1, PN2, PN3 in these hexagonal regions respectively; after the state change, the terminal becomes able to maximally receive PN1 in all the regions. This operation is equivalent to the one with the PN_A of FIG. 17 being replaced by PN1 and with PN_C replaced by PN2 and PN3. The terminal experiences a change in per-PN received power, and executes handoff processing.

Figure 18:
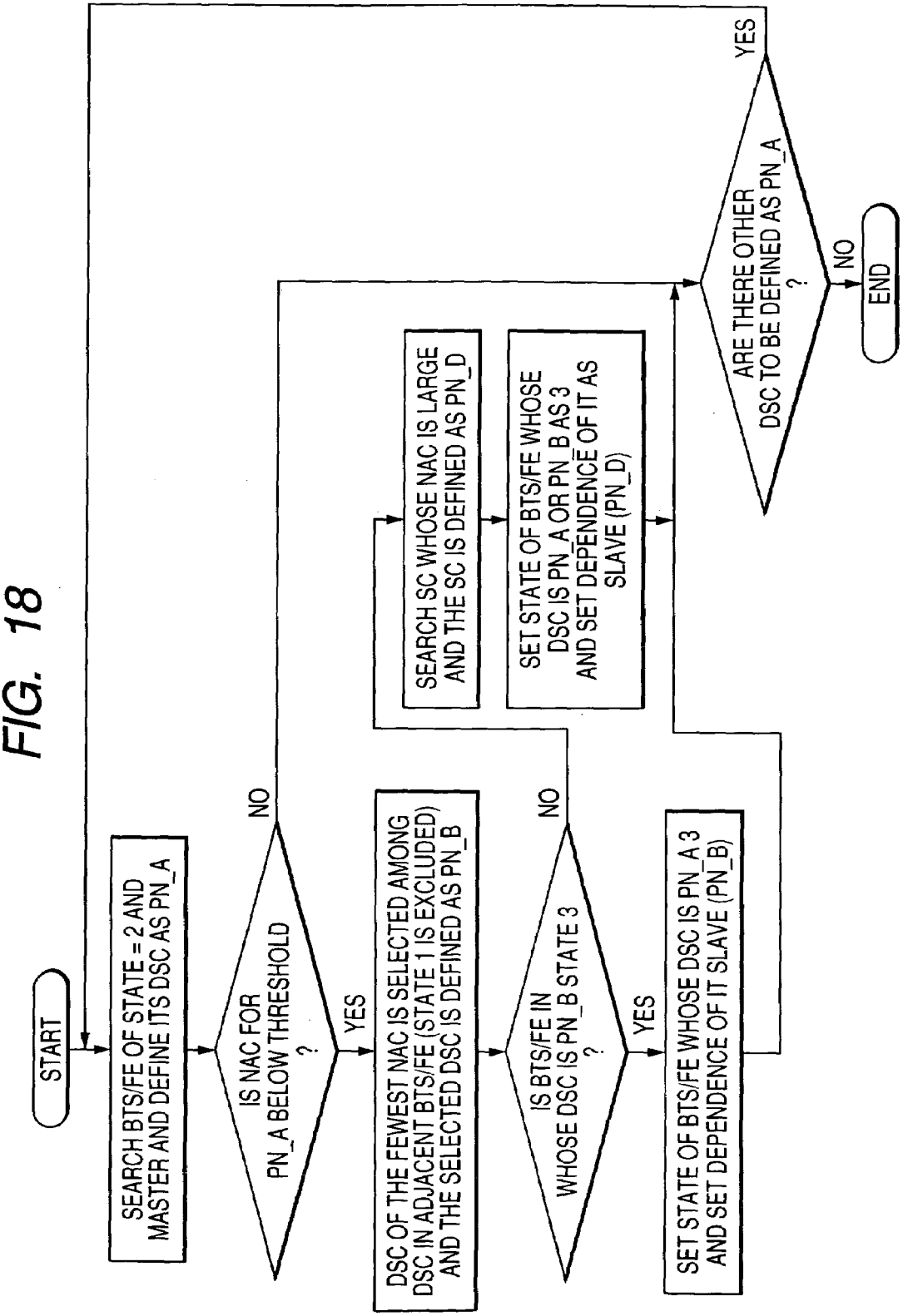
FIG. 18 is a flow of state transition "C" according to the invention.

FIG. 18 shows a flow of state transition in case the state of a front end (FE) unit changes from 2 to 3. Judgment is made for the PN_A that the FE unit of the state 2 uses as its DSC. Firstly, in case the PN_A's available user channel number (NAC) is less than a predetermined threshold value, select a scramble code PN_B that is the least in available user channel number from among DSCs of certain FE units of the FE units being connected to the same base station apparatus as that of the above-noted FE unit, wherein the certain FE units cover neighboring regions and, in this sense, are called the neighboring FE units, while excluding therefrom any FE unit(s) of the state 1. The above-noted neighboring FE units are obtainable by referring to the FE state management table such as shown in FIG. 11. It is noted that in case such the PN_B is absent, the procedure is redone while again designating another PN_A.

When the FE unit using PN_B as its DSC is of the state 3, let the state of an FE unit using PN_A as its DSC be 3. Furthermore, in case the FE unit using PN_B as its DSC is Master, let the FE unit using PN_A as its DSC be Slave of PN_B. In case the FE unit using PN_B as its DSC is Slave, it presently becomes Slave of the scramble code PN_C that the FE unit using PN_B as its DSC is now outputting in addition to the DSC. If this is the case, let it be Slave of the same PN_C even at the FE unit using PN_A as its DSC. In a way corresponding to the setup of letting the dependency relation of AREA_A be Slave(PN_B) or Slave(PN_C), increase an output of PN_B or PN_C in addition to an output of PN_A at an output of the FE unit using PN_A as its DSC.

Alternatively, in case the FE unit using PN_B as its DSC is in the state 2, search from those other than PN_A and PN_B a scramble code PN_D which is the greatest in available user channel number and in which Slave is absent. Set to 3 the state of FE units using PN_A and PN_B as their DSCs. In addition, set the dependency relation thereof to Slave(PN_D). If an FE unit using PN_D as its DSC is present, set the state of such FE unit to 3, while letting the dependency relation be Master (PN_D). And, at the FE unit that was set to Slave(PN_D), increase an output of PN_D. The processing above will be repeated with respect to all of the PNs that are used by Master areas of the state 2 as their DSCs.

With the state transition, the area shape is changed from that of FIG. 14A to FIG. 15A whereas the FE state management table changes from FIG. 14B to FIG. 15B. In other words, in the three hexagonal regions shown in FIG. 14A, prior to the state transition, the terminal can maximally receive PN1, PN2, PN3 in these hexagonal regions respectively; after the state change, an area which enables the terminal to maximally receive PN4 is created at a boundary of three hexagonal regions. The terminal experiences a change in per-PN received power, and executes handoff processing.

Figure 19:
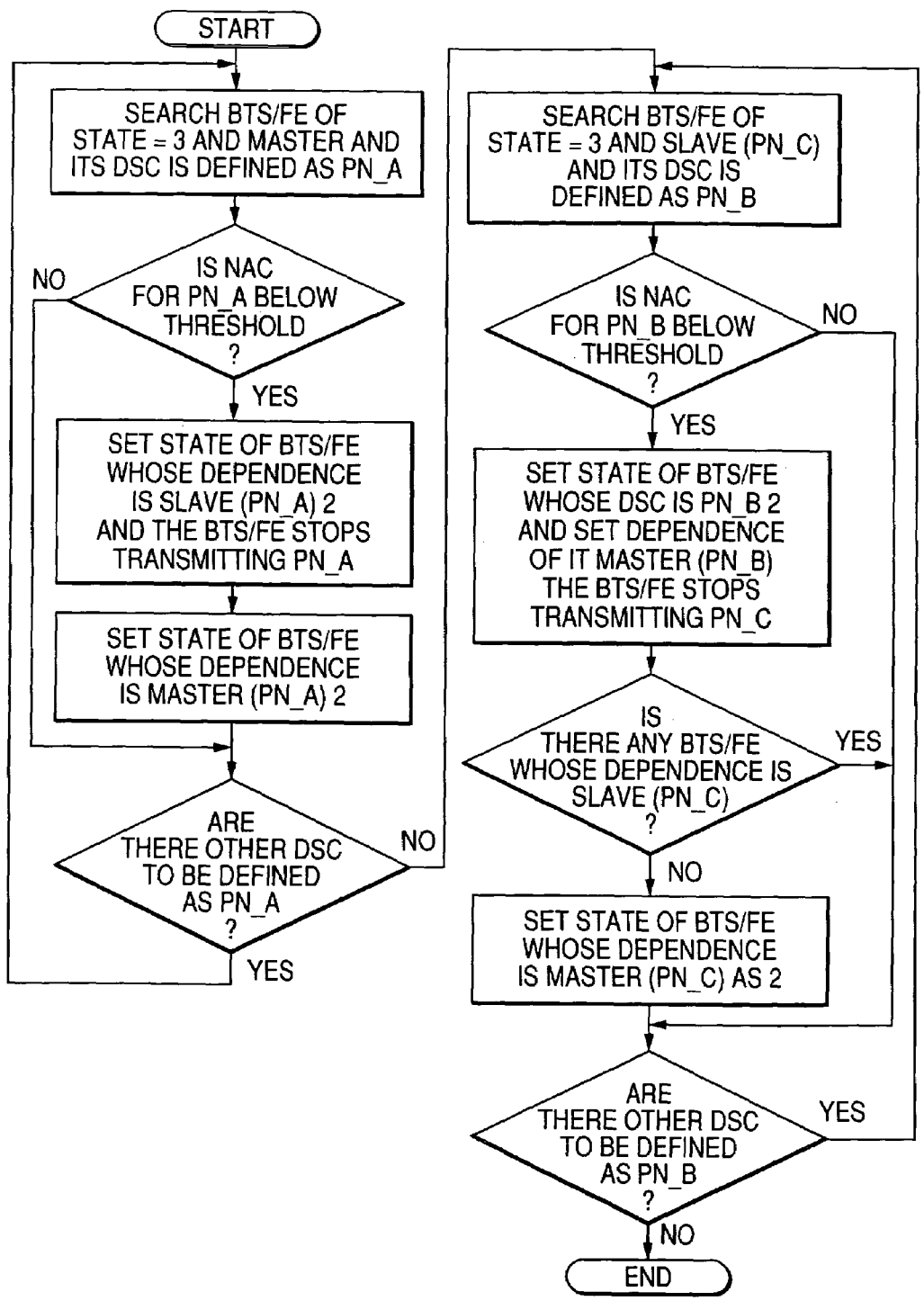
FIG. 19 is a flow of state transition "D" according to the invention.

FIG. 19 shows a flow of state transition in case the state of a front end (FE) unit changes from 3 to 2. First, when the available user channel number (NAC) goes below the threshold value in regard to the PN_A that is the DSC of an FE unit of the state 3 and Master, an output of PN_A that is presently lent to another FE unit goes off. To do this, in an FE unit of the state 3 at Slave(PN_A), stop the PN_A output and output respective DSCs only, thereby setting the FE state to 2. In addition, also for the Mater FE unit of the state 3 which has lent out the PN_A, set its state to 2.

After completion of the testing of every Master FE unit of the state 3, go to the next step which performs inspection as to the DSC(PN_B) of an FE unit, which is of the state 3 and Slave(PN_C). If an available user channel number of PN_B is greater than the threshold value, then determine that the use of only PN_B makes it possible to accommodate those terminals existing within a region covered by such the FE unit. Then, stop the output of PN_C which is a scramble code that is not DSC in an FE unit using PN_B as its DSC, and output only PN_B that is DSC. Update the dependency relation to Master (PN_B); change the FE state to 2. With this update processing, in case any FE unit of Slave(PN_C) is no longer present, set the area state of Master(PN_C) also to 2.

With the state transition above, the area shape is changed from that of FIG. 15A to FIG. 14A while the FE state management table changes from FIG. 15B to FIG. 14B. More specifically, a location capable of maximally receiving PN1, PN2, PN3, PN4 in the three hexagonal regions respectively existed prior to the state change; after the state change, the terminal behaves to maximally receive PN1, PN2, PN3 in such hexagonal regions, respectively. A terminal which has communicated using PN4 experiences received power reduction of PN4, and executes handoff processing to PN1, PN2, PN3.

Figure 20:
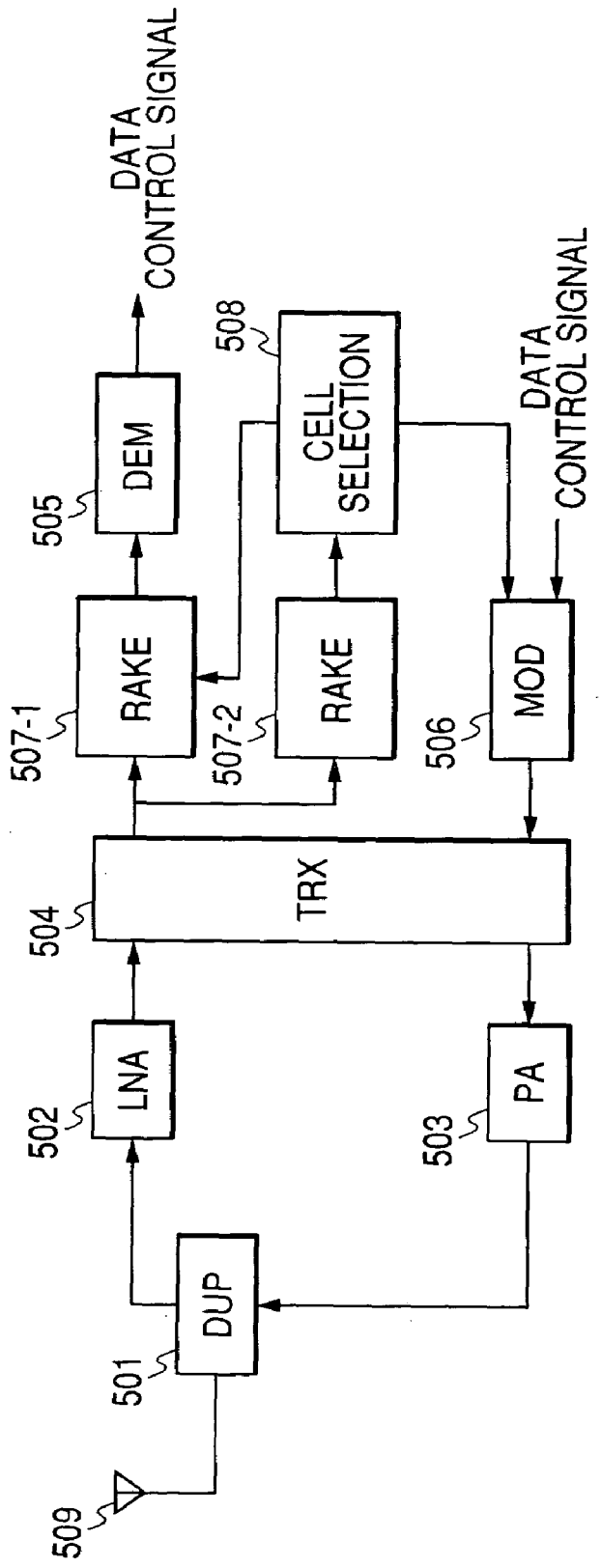
FIG. 20 shows a terminal device for communication with the base station apparatus embodying the invention.

FIG. 20 is a block diagram showing a terminal device for communication with the base station apparatus embodying the invention. A duplexer 501 is operable to switch between transmitting and received signals of a two-way radio antenna 509. In signal reception events, it provides interconnection of from the antenna 509 to a low-noise amplifier 502; during signal transmission, provide a connection from a power amp 503 to the antenna 509. A radio-frequency transmitter/receiver or "transceiver" circuit (TRX) 504 includes a frequency converter and a converter for conversion between analog and digital signals and vice versa. The TRX 504 performs frequency conversion of from a carrier wave band to base band with respect to a received signal and also applies thereto analog-to-digital conversion; for a transmission signal, TRX 504 performs frequency conversion from the base band to carrier wave band and digital-to-analog conversion. A send data sequence and a control signal which are contained in a received baseband signal are subjected to RAKE combining by a RAKE combiner unit 507-1, and thereafter are taken out at a decode/demodulating unit (DEM) 505 through removal of the coding and modulation, which were carried out at the base station apparatus. Note here that a scramble code selection result is needed for designation of a scramble code during the RAKE combining. A data bit sequence to be sent from a terminal toward the base station is coded and modulated at a code/modulating (MOD) unit 506 and is applied a scramble code that is uniquely determined by the ID of such terminal per se and/or the ID of a presently communicating front end (FE) unit, to which the terminal belongs. For example, in case a PN code is generated by a shift register, these two IDs are used to uniquely determine a mask being applied to the shift register. As for the "cdma2000" architecture, such scheme is described in the standardization document (3GPP2, C.S0024-A, "cdma2000 High Rate Data Air Interface Specification").

A RAKE combiner 507-2 handles a pilot signal to be sent from the base station in such a way as to perform correlative arithmetic processing for every scramble code to thereby execute RAKE combining and then measure and specify electrical power as received per scramble code. From a measurement result of such received power, it is possible to make a decision as to which one of the scramble codes is appropriate for enabling a terminal to communicate. This judgment is done by a cell selection unit 508. The information concerning which scramble code is proper for use with the terminal to enable communication thereof is sent to the base station while using a so-called "RouteUpdate" message in the cdma2000 protocols. Such the information is generated at the cell selector and is input to MOD 506 as part of the terminal's send signal. Here, if this RAKE combiner 507-2 fails to perform the RAKE combining of the pilot signal, a result is as follows: when a scramble code other than a default scramble code is additionally output from an FE unit of the base station apparatus, it is no longer possible to select such additive scramble code at a post-stage cell selector. The reason of this is that in this case, the default scramble code and the additive scramble code pass through the same transmission path so that the default scramble code which is high in send power is received strongly at all times.

When performing the above-noted RAKE combining and cell selection, the terminal must be aware of which scramble code's pilot should be subjected to RAKE combining. To this end, the scramble code to be RAKE-combined is specified while referring to a "Neighbor List" as sent from the base station apparatus (in cdma2000, this list belongs to the same connection layer as the "RouteUpdate" message). When total power of pilots of the same scramble code being RAKE-received from a plurality of FE units of the base station becomes greater than the received power of a pilot of another scramble code, hand-over is done in such a way as to perform communications using the scramble code to be received by RAKE reception. In this way, it is possible to create a virtual cell which permits the terminal device to communicate by use of an additive scramble code at a location to which signal transmitting events using additive scramble codes from a plurality of front end units are gathered, such as the portion indicated by the scramble code PN4 of FIG. 15A. Additionally, similar RAKE combining is applied to data part also, as stated previously.

The embodiments of the present invention have been explained under the assumption that this invention is applied to cdma2000-based mobile cellular communications network systems. This invention is also applicable to other types of cellular systems relying upon code division multiple access (CDMA) architectures. For example, in wideband CDMA (W-CDMA), a common pilot channel (CPICH) is used for the cell identification, while a dedicated physical channel (DPCH) is used for communication of user data. These are sent with per-cell different scramble codes applied thereto, in a similar way to cdma2000. The cdma2000's channel multiplexing based on Walsh codes is realized by orthogonal variable spreading factor (OVSF) codes. A channel multiplexing method in W-CDMA is principally the same as that of cdma2000. In view of the fact that the pilot signal of cdma2000 is caused to correspond to CPICH of WCDMA while the user data of the former corresponds to DPCH of the latter, the invention is also applicable to WCDMA. Note however that since WCDMA operates in the presence of base stations which are asynchronous with each other, a need is felt in this invention to design each terminal so that it has a buffer memory with its storage capacity large enough to store received signals in order to achieve at the terminal the RAKE combining of user data and pilot signals to be sent from a plurality of front end units.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station apparatus comprising a plurality of front end units for transmitting and receiving signals via antennas to and from a plurality of mobile stations and a signal processing unit coupled to said plurality of front end units and a network for performing processing of the signals being transmitted and received,
   wherein said signal processing unit comprises:
   a plurality of modulator units for modulating a signal received from said network and to be transmitted to a mobile station in each area to which the mobile station that is a destination of the transmission signal belongs;
   a weight combining unit for performing weight combining of outputs from at least a part of said plurality of modulator units and for outputting a result of the weight combining to said plurality of front end units; and
   wherein communication is performed while assigning a channel to each mobile station and wherein a weight matrix used for said weight combining is controlled based on an available channel number per said area.

2. The base station apparatus according to claim 1, wherein m units of said modulator units and n units of said front end units are provided, where m>n, and wherein when using the n front end units to form more than n areas, said weight combining unit performs weight combining so that an output from at least either one of said modulator units is output from said plurality of front end units.

3. The base station apparatus according to claim 1, wherein said modulator units output a pilot signal for each of said areas and wherein said weight combining unit performs, for hand-over between areas of said mobile stations, weight combining by use of a modified weight matrix to thereby change an output of the pilot signal for each area from said front end units.

4. The base station apparatus according to claim 1, wherein said plurality of modulator units use a scramble code different for each of said areas to perform scrambling with respect to said transmission signal.

5. The base station apparatus according to claim 4, wherein said plurality of modulator units use a pseudo noise (PN) code as a scramble code and assign a Walsh code-defined channel to each of mobile stations belonging to the same area.

6. The base station apparatus according to claim 1, wherein said signal processing unit comprises a RAKE combiner for processing a signal from a mobile station to thereby estimate a reception timing and a phase of a signal received at at least part of said plurality of front end units and for performing RAKE combining of the received signal at said at least part of the front end units.

7. The base station apparatus according to claim 1, wherein each of said plurality of front end units and said signal processing unit has an electro-optical converter and an opto-electrical converter and wherein said plurality of front end units and said signal processing unit perform signal transfer via an optical fiber while converting a signal to be processed as an electrical signal at each part into an optical signal.

8. A communication control method for use in a base station apparatus comprising a plurality of front end units for transmitting and receiving signals via antennas to and from a plurality of mobile stations and a signal processing unit connected to a network and said plurality of front end units for performing processing of the signals being transmitted and received, said method comprising the steps of:
    causing said signal processing unit to modulate a signal being received from said network and to be transmitted to a mobile station in each area to which the mobile station that is a destination of the transmission signal belongs;
    performing weight combining of outputs from at least a part of said plurality of modulator units and for outputting the result output to said plurality of front end units; and
    wherein communication is performed while assigning a channel to each mobile station and wherein a weight matrix used for said weight combining is controlled based on an available channel number for each of said areas.

9. The communication control method according to claim 8, wherein an available channel number is managed for each of said areas and wherein threshold judgment for the available channel number is used as a trigger of weight alteration of said weighting combining.

10. The communication control method according to claim 8, wherein said base station apparatus has m units of said modulation units and n units of said front end units, where m>n, and wherein when using the n front end units to form more than n areas, weight is used at the weight combining step so that an output from at least either one of said modulator units is output from said plurality of front end units.

11. The communication control method according to claim 8, further comprising the steps of:
    during said modulation, outputting a pilot signal for each of said areas; and
    during said weight combining, performing weight combining by use of a modified weight matrix for hand-over between mobile station areas to thereby vary an output of the per-area pilot signal from said front end units.

12. The communication control method according to claim 8, wherein said modulation of the transmission signal includes scramble processing using a scramble code different for each of said areas.

13. The communication control method according to claim 12, wherein the modulation for each of said areas includes multiplication using mutually orthogonal codes and scramble processing using more than one scramble code.

14. The communication control method according to claim 12, further comprising the steps of:
    predefining default scramble codes at said plurality of front end units respectively, and
    modulating the weight of said weight combining in such a way as to transmit a transmission signal modulated using a scramble code other than said default scramble codes from said plurality of front end units in accordance with a number of channels available for each area corresponding to the default scramble code in place of the transmission signal modulated using the default code or while adding it to the transmission signal modulated using the default scramble code.

* * * * *